(12) United States Patent
Hobbs et al.

(10) Patent No.: US 7,747,086 B1
(45) Date of Patent: Jun. 29, 2010

(54) METHODS AND APPARATUS FOR ENCODING A SHARED DRAWING MEMORY

(75) Inventors: David Victor Hobbs, Surrey (CA); Ian Cameron Main, Vancouver (CA)

(73) Assignee: Teradici Corporation, Burnaby, British Columbia (CA)

( * ) Notice: Subject to any disclaimer, the term of this patent is extended or adjusted under 35 U.S.C. 154(b) by 1144 days.

(21) Appl. No.: 11/333,955

(22) Filed: Jan. 17, 2006

Related U.S. Application Data

(60) Provisional application No. 60/703,767, filed on Jul. 28, 2005.

(51) Int. Cl.
*G06K 9/36* (2006.01)
(52) U.S. Cl. ................................ 382/232; 382/233
(58) Field of Classification Search ............. 382/232, 382/233; 348/14.08, 14.011; 713/155, 176; 380/231, 284; 345/501; 709/226; 370/352
See application file for complete search history.

(56) References Cited

U.S. PATENT DOCUMENTS

| | | | |
|---|---|---|---|
| 5,157,491 A * | 10/1992 | Kassatly | 348/14.08 |
| 5,583,573 A | 12/1996 | Asamura et al. | |
| 5,767,978 A | 6/1998 | Revankar et al. | |
| 6,664,969 B1 | 12/2003 | Emerson et al. | |
| 7,596,692 B2 * | 9/2009 | Fox et al. | 713/155 |
| 2003/0177172 A1 | 9/2003 | Duursma et al. | |
| 2003/0189574 A1 | 10/2003 | Ramsey | |
| 2003/0191860 A1 | 10/2003 | Gadepalli et al. | |
| 2004/0008205 A1 | 1/2004 | O'Neill et al. | |
| 2004/0008213 A1 | 1/2004 | O'Neill et al. | |
| 2004/0008214 A1 | 1/2004 | O'Neill et al. | |
| 2004/0010622 A1 | 1/2004 | O'Neill et al. | |
| 2004/0062305 A1 | 4/2004 | Dambrackas | |
| 2006/0233201 A1 | 10/2006 | Wiesenthal | |

OTHER PUBLICATIONS

Humphreys, Greg and Hanrahan, Pat, "A Distributed Graphics System for Large Tiled Displays", Proceedings IEEE Visualization '99, 9 pages, 1999.

Jeffrey Michael Gilbert, "Text / Graphics and Image Transmission over Bandlimited Lossy Links", A thesis submitted in partial satisfaction of the requirements for the degree of Doctor of Philosophy In Engineering Electrical Engineering and Computer Sciences in the Graduate Division of the University of California, Berkeley, Spring 2000, 276 pages, Berkeley, CA.

(Continued)

*Primary Examiner*—Anh Hong Do
(74) *Attorney, Agent, or Firm*—Moser IP Law Group

(57) ABSTRACT

A display encoding system is disclosed. The display encoding system includes at least one processor, an encoding circuit, the encoding circuit having a structure separate from the structure of the processor(s), a communication connection to a computer network, a drawing memory, a traffic manager, and a memory access circuit. The processor(s) are configured to execute drawing commands, access the drawing memory via the memory access circuit to store image representation(s) in the drawing memory. The encoding circuit is configured to access the drawing memory to encode at least a portion of the image representation(s) stored in the drawing memory based on the executed drawing commands. The traffic manager is configured to transmit the encoded image over the communication connection to at least one display device.

15 Claims, 14 Drawing Sheets

OTHER PUBLICATIONS

Nieh, Jason, Yang, S. Jae, and Novik, Naomi, "A Comparison of Thin-Client Computing Architectures", Technical Report CUCS-022-00, Network Computing Laboratory, Columbia University, 16 pages, Nov. 2000.

"OpenGL Vizserver™3.1 Application-Transparent Remote Interactive Visualization and Collaboration", White Paper, Silicon Graphics Inc., 15 pages, 2003.

US Non-Final Office Action mailed Jun. 4, 2008 for U.S. Appl. No. 11/549,055, filed Oct. 12, 2006.

* cited by examiner

Architecture for Framebuffer Copy Method
PRIOR ART

Encoding Sequence Method

METHODS AND APPARATUS FOR ENCODING A SHARED DRAWING MEMORY

RELATED APPLICATIONS

This application claims priority to U.S. Provisional Patent Application Ser. No. 60/703,767, entitled METHOD AND APPARATUS FOR ENCODING A SHARED DRAWING MEMORY, filed Jul. 28, 2005, incorporated herein by reference in its entirety.

FIELD OF THE INVENTION

The present invention relates broadly to encoding computer display images for communications across a network. Specifically, the present invention relates to compressing and transmitting images rendered by the graphics subsystem of a data processing system. More specifically, the present invention relates to display images in a framebuffer that are accessed, compressed and transmitted in priority sequence with the aid of drawing command hints issued by a processor.

BACKGROUND OF THE INVENTION

Historic advances in computer technology have made it economical for individual users to have their own computing system, which caused the proliferation of the Personal Computer (PC). Continued advances of this computer technology have made these personal computers very powerful but also complex and difficult to manage. For this and other reasons there is a desire in many workplace environments to separate the user interface devices, including the display and keyboard, from the application processing parts of the computing system. In this preferred configuration, the user interface devices are physically located at the desktop, while the processing and storage components of the computer are placed in a central location. The user interface devices are then connected to the processor and storage components with some method of communication.

There are various methods for communicating the display image from a data processor across a standard network to a remote display. These methods, described below, suffer significant shortcomings.

Drawing Command Transfer Method

FIG. 1 shows the architecture for a data processing system that supports a remote display by transferring drawing commands across a network. As illustrated, central processing unit (CPU) 100 of the data processor is connected to various devices such as system memory 102 and a network interface 104 by a chipset 106.

CPU 100 uses a graphics application interface (G-API) such as OpenGL, GDI or others to draw a display image in the normal way but rather than being issued to a local graphics processing unit (GPU), drawing processor or function, the drawing commands are captured by software on the CPU and transmitted across network 108 to remote drawing processor 110. Remote drawing processor 110 renders the display image in remote framebuffer 112. Remote display controller 114 then accesses the image in the framebuffer and provides rasterized video signal for remote display 116. In a typical implementation. remote drawing processor 110 is supported by a remote CPU, operating system and graphics drivers. In this case, the drawing commands are issued to the remote CPU which then draws the image using its local drawing capabilities and remote framebuffer 112.

Variations on the drawing command transfer method include the transmission of different abstractions of drawing commands. X Windows is one example that captures and transfers high level drawing commands while RDP is another example that converts most of the drawing commands to simple low-level primitives before transferring them to the remote system. Regardless of the level of abstraction, a CPU sub-system is usually required at the remote system as an interface between the drawing commands and the remote drawing function.

One problem with the use of low level commands with simple remote hardware is that the system graphics capabilities are constrained by the low-complexity graphics capabilities of the remote system. This is due to high-level drawing commands that leverage graphics hardware acceleration functions in a typical computing platforms no longer being available in the simplified command set. In order to draw complex images using simple commands, the number of commands increase significantly which increases the network traffic and system latency.

Another problem with drawing command transfer methods is that drawing commands may relate to the rendering of structures outside of the viewable area of the display. In these cases where drawing commands don't immediately change the displayed region of an image, unnecessary network traffic is generated to accomplish the remote rendering.

A third problem is that converting commands to simple commands is performed by the data processor and is a processing intensive function. The result is that the conversion process slows down the data processor and reduces the performance of applications running on the data processor.

The problem with systems that support complex drawing commands is that these systems required increased complexity of the remote computing system (i.e. O/S, graphics driver and hardware). The result is an increase in cost, maintenance and support requirements for the remote user equipment which is in direct conflict with the original motivation for centralization i.e. reduced support of the remote display system.

Framebuffer Copy Method

Another method for separating the user interface from the data processor is the framebuffer copy method. This method solves the drawing performance problem described above by using the operating system, graphics driver and optional graphics drawing hardware features of the data processing system to first draw the image in a framebuffer on the data processor side of the network before transferring it.

FIG. 2 shows the architecture for a data processing system that supports a remote display by copying either compressed or uncompressed bitmaps from a framebuffer across a network. In the diagram, the CPU of data processor 200 is connected to various peripheral devices including system memory 202, network interface 204 and optional dedicated GPU or drawing processor 206 by chipset 208. As above, the CPU uses a G-API to draw an image. Drawing commands are issued to drawing processor 206 which renders the image in framebuffer 210. Alternatively, the drawing processor might not be a dedicated device but rather a function of the CPU or chipset and the image may be drawn in an area of system memory 202.

Once an image has been rendered in the framebuffer, a software application on the CPU or a peripheral hardware component accesses the framebuffer and copies partial or complete frames across network 211 to remote framebuffer 213. In cases where the framebuffer data is compressed prior to transmission, it is decompressed by software- or hardware-based remote decoder 212 before being stored in remote framebuffer 213. Remote display controller 214 accesses the image, generates a raster signal and displays the image on remote display 216.

Neither of the methods discussed above support a direct network connection between the framebuffer and the network interface. Consequently, various methods exist to overcome the problem of transferring the image from the framebuffer of the data processor to the remote framebuffer. For example, VNC is a software product that uses a software application at each end of a network. An encoding application on the data processor reads the framebuffer, encodes the image and then sends it to the decoder application at the remote user interface where it is decoded by the VNC application and written into the remote framebuffer.

The most serious shortcoming of this technique arises during times of complex image generation. Given that encoder software runs on the same processor as the drawing application, the processor becomes overloaded with both encoding and drawing operations which slow down the drawing speed and degrades the user experience.

A second problem arises as a result of asynchronous host and remote framebuffers and the fact that the application does not precisely track all screen changes and catch all events on the data processor as might be the case if every refresh of the framebuffer were captured. As a result, the image viewed at the remote display becomes different from the intended image whenever areas of the remote framebuffer are updated out of synchronization with the source framebuffer at the data processor.

OpenGL VizServer from Silicon Graphics is another product that uses software applications at each end of the network. Unlike VNC, VizServer is capable of capturing every updated framebuffer by reading the viewable region of every frame into the system memory of the CPU once it has been rendered in the framebuffer. This is achieved by monitoring the G-API for framebuffer refresh commands such as glFlush( ). Once in system memory, the frames are encoded and transmitted across the network to a remote system that requires a minimum of a thin client decoder with drawing capabilities. One problem with this method is that it is CPU intensive. For example, VizServer optimally requires one dedicated CPU for reading the framebuffer, one for managing the network interface and two more dedicated processors to support the compression of the image in system memory. A second problem is that this method uses a software approach to image compression. General purpose CPUs are not optimized around pixel-level image decomposition or compression but are limited to generic, block-based color reduction or difference calculation techniques that result in both lower compression ratios and poorer image quality at the remote display. A third problem with CPU-based encoding systems is that they use the network interface of the data processing system for the transmission of display image data. In cases where the same network interface is also used for connectivity of other real-time traffic streams with the remote system (e.g. audio and USB traffic) and other CPU-bound traffic, the network interface becomes a system bottleneck, packets are either delayed or dropped and the user experience at the remote system is significantly degraded.

A variation on the software-based framebuffer copy approaches such as VNC and OpenGL VizServer is a screen scraper hardware solution disclosed under U.S. Pat. No. 6,664,969 to Emerson, et al. entitled "Operating system independent method and apparatus for graphical remote access." This method uses a separate hardware module to read the framebuffer, compress the image and send it to an application at the remote user interface. This approach removes the encoding software load, but also consumes the system bus of the data processing sub-system each time the framebuffer is read. In cases where real-time frame updates are required, the load on the system bus directly compromises the performance of the data processor and slows down the application. As with the VNC software method, this method has display continuity problems associated with synchronizing multiple framebuffers or pointers.

Hybrid Variations

There are also variations on the above methods that provide a combination of drawing commands and bitmap transfer functions to enable the remote display of computer display images. One such variation is disclosed by Duursma et al. in U.S. Pat. Application 20030177172 entitled "Method and system for generating a graphical display for a remote terminal session." In this approach, an application on the data processor is capable of recognizing screen images components as either being drawing commands or bitmaps. Drawing commands are handled similarly to the drawing command transfer method described above. However, when a bitmap is identified, a compressed data format of the bitmap is retrieved and transmitted to the remote terminal session in place of the original bitmap. While this feature adds bitmap capabilities to the command transfer method, the command processing overheads persist so little overall improvement to the drawing command processing is realized.

None of the remote display methods described above evaluate the encoding of the image in the context of other data streams that share the network or network availability. For example, if the display image incorporates a video frame in one region only, there is no attempt by the framebuffer encoder or the drawing command parser to optimize encoding for that region based either on other traffic priorities or external network conditions.

GPU as Encoding Processors

It has been suggested that the programmable section of a GPU be used to perform limited image encoding methods such as color cell compression or fractal compression described below. In one example, it was proposed that the GPU perform color cell compression encoding as a method for supporting remote display capabilities. One problem with this method is that color cell compression provides a limited compression ratio when compared with other compression methods available for computer display compression. As described above, the GPU's floating point vector processing engines are unsuitable for these pixel-oriented image processing methods.

A second problem with this approach lies in the dataflow through the graphic pipeline. To prevent data loop back, the back end of the GPU pipeline must be modified by replacing the standard video interface with an interface such as a network or system bus interface suitable for the compressed data stream. While the image encoder also requires a similar network connection, the data structures that interface with the network interface logic are optimized for compressed image data.

In another example, it was proposed that the GPU perform fractal compression, a lossy compression technique that exploits self-similarity in images. This approach shows that the GPU offers performance advantages over a general purpose CPU for some components of the fractal algorithm. While suitable for video or still image compression, fractal compression does not meet the high quality compression requirements required of high detail computer image information such as text and icons.

In summary, existing methods incur significant software and hardware processing overheads, are unable to ensure synchronization between the data processor and remote systems, and require a CPU and software at the remote user. A better method of accessing the framebuffer that does not impact the system drawing architecture is required.

SUMMARY OF THE INVENTION

The present invention enables the efficient communication of encoded computer display images and other user interface signals between host and remote systems across a network by providing an encoding system that accesses and encodes a shared drawing memory using methods based in part upon drawing commands.

In one aspect, the present invention shares a drawing memory with a drawing processor and intercepts and interprets drawing commands issued by a CPU to the drawing processor that identify what parts of an image in the memory have changed and how the image has changed for the purpose of enabling optimized encoding of the image directly from the memory.

In another aspect, the invention provides an adaptive framebuffer encoding method that adapts to network availability as determined by a traffic manager and predicted bandwidth requirements as interpreted by commands issued to the drawing processor.

In another aspect, the invention intercepts and interprets system-related display commands issued by a CPU to a display controller for the purpose of enabling a local encoding sequencer to emulate the local presence of a remote display controller.

In yet another aspect, the invention provides a method for reducing the power consumption of an encoding system by controlling the power consumption of encoding elements based on image type and encoding decisions determined by the presence and type of updated data in the drawing memory.

The present invention offers many benefits over existing methods. By enabling a data processing system that first renders images in a local framebuffer before the image is transmitted, the invention removes the need for a remote drawing processor as required for the drawing command transfer method. By emulating the interface of a display controller, the present invention is transparent to the application and drawing processor and does not load the system resources in the same manner as the framebuffer copy method. Additionally, by drawing the image at the data processor and providing an equivalent image to the display controller interface at the data processor, the invention inherently removes any requirement for a CPU, GPU, operating system or application software at the remote system to draw the image. This lowers both equipment and maintenance costs. By limiting the framebuffer accesses and associated processing to sections of the framebuffer that have changed and by controlling the encoder methods, the invention offers a low power consumption solution. By evaluating network conditions and monitoring drawing commands, the system optimizes image encoding in the context of available network bandwidth, resulting in efficient compression and an improved user experience.

Other features and advantages of the present invention will become apparent from reading the following detailed description, when considered in conjunction with the accompanying drawings, in which:

DETAILED DESCRIPTION

Figure 1:
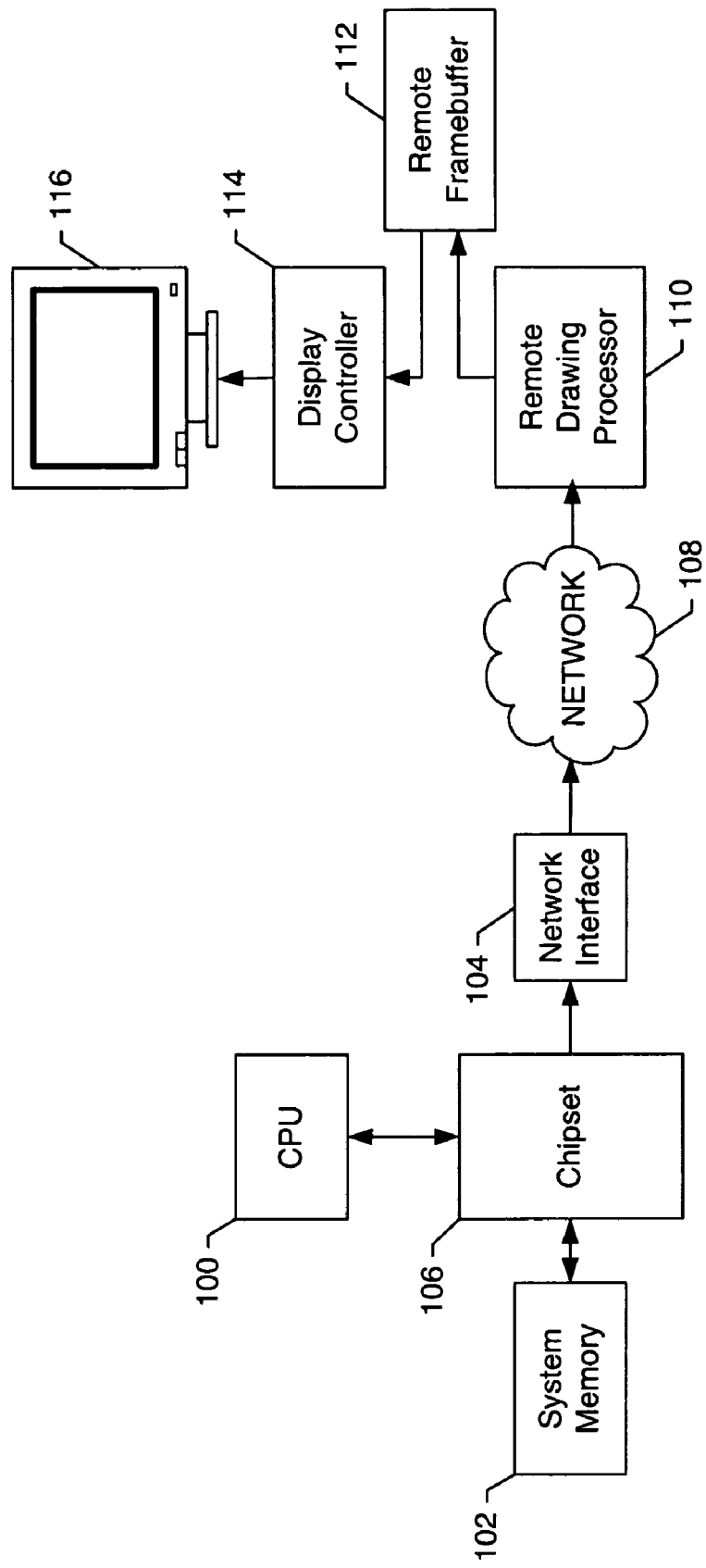
FIG. 1 is an illustration in block diagram form of a data processing system architecture that supports the remote display of display images using drawing command transfer method.
Figure 2:
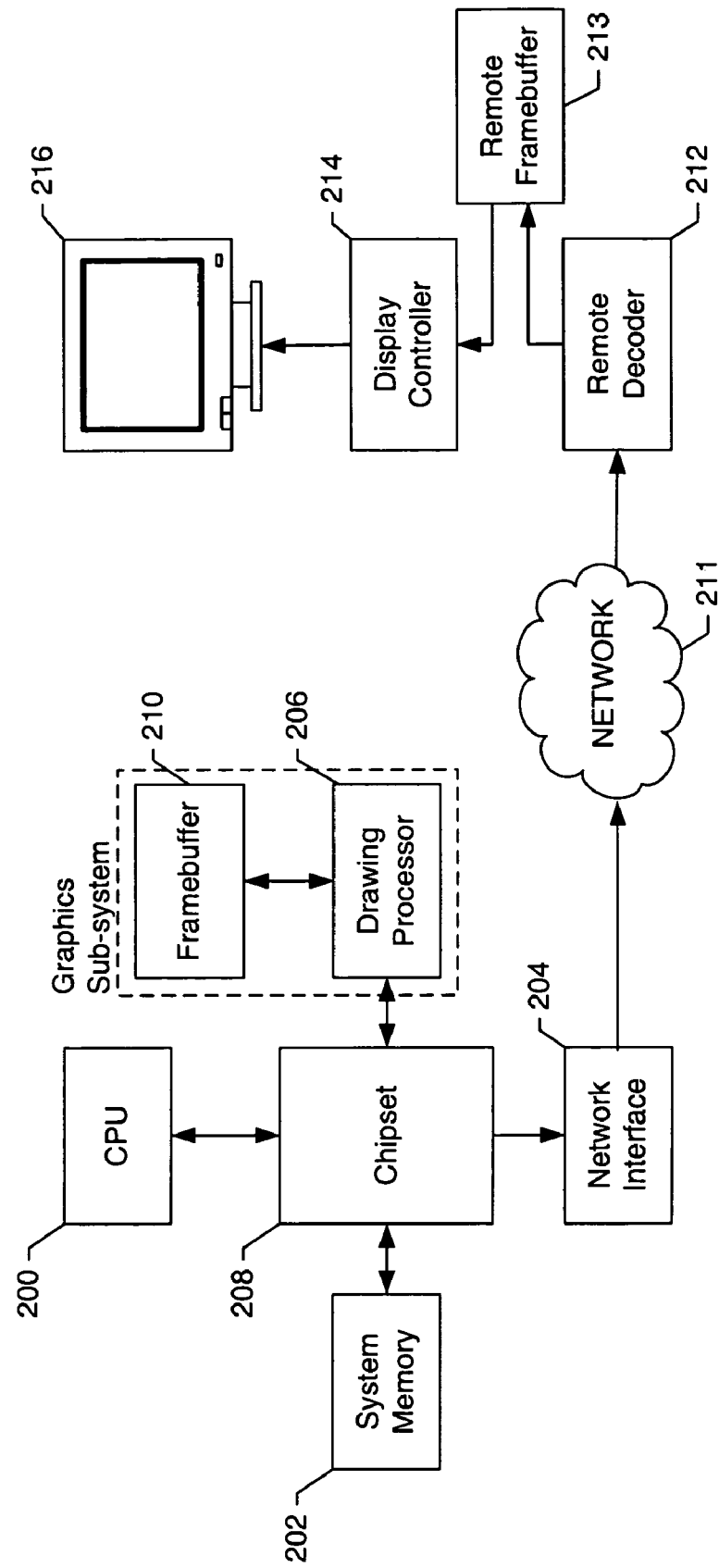
FIG. 2 is an illustration in block diagram form of a data processing system architecture that supports the remote display of compressed or uncompressed display bitmaps using the framebuffer copy method.

Architecture for a Server-Side GPU/Encoder for a Remote Display System

A traditional Graphics Processing Unit (GPU) is a slave device connected to a host CPU system, drawing memory and display system using an integrated display controller. In addition to the interface logic to support these connections, the GPU includes a drawing processor to handle the rendering or conversion of dynamic graphic scenes into a sequence of images represented as pixel data stored in a local memory for subsequent display. In the case of a device optimized for remote display applications, the device does not include the display controller function but rather requires an image encoder capable of compressing the image pixel data prior to sending it to the remote display. The following section identifies the difference in functional requirements between the drawing processor and the image encoder in the case of a remote display system.

Drawing Processor Architecture

The drawing processor receives a list of drawing commands from an application and/or operation system running on a CPU as its primary input. There is no real-time constraint on the throughput of commands issued by the application to the drawing processor as different commands have different effects on the final image. Some commands result in complete scene changes while others result in little or no change to the final image. Furthermore, a drawing command may result in various asynchronous updates to different areas of the image requiring that the drawing processor is capable at efficient random access to the image memory. The operations that result from drawing commands are varied in complexity. For example, a simple command may result in a color fill of a two dimensional region while a more complex command may result in the transformation and texture mapping of multiple image components represented as floating point 3D data structures.

The drawing processor includes two high bandwidth interfaces to support the functions described above. First, it requires a high bandwidth connection to the CPU running the application and OS. Second, it requires a high bandwidth read/write interface to an image memory. As there is no upper limit to the number of drawing commands that can be issued to the drawing processor, there is no upper bound to the memory bandwidth that may be required by drawing processor. Therefore, to maximize throughput, high performance drawing processors use complex memory architectures including very wide memory interfaces and sophisticated caching structures. In addition to interfaces, the drawing processor also has various different hardware processing elements cascaded in a graphics pipeline to support the different rendering functions such as texture and lighting shading functions, clipping and normalization functions, amongst others. These hardware processing elements are comprised of floating point vector processing units and the associated registers and control logic necessary for floating point vector processing functions such as the transformation of graphic scene information between different co-ordinate systems or the mapping of textures and lighting effects onto three-dimensional surfaces.

Due to their narrow functional requirements described above, the drawing processor does not include integer or bit-orientated processing functions, has no native support for scatter operations (e.g. computing p[i]=a) and is inefficient at address conversion or reading back values from pixel memory. While the GPU writes an integer pixel image as a final stage in the graphics pipeline, it has no requirement to include the processing circuitry necessary to manipulate the integer data. The image encoder reads the pixel image as the first step in an encoding sequence and then requires its own specialized image processing pipeline capable of compressing the integer data. The functional requirements of the image encoder are significantly different to that of the drawing processor described.

Image Encoder Architecture

Unlike the drawing processor, the image encoder may operate independently from the CPU, receiving pixel data stored in local memory as its primary input. The image encoder requires a high speed interface to image memory in order to read the image at a high rate. It then detects changes in the image and sends encoded pixel data and/or change information as a data stream across the network to a remote decoder function capable of generating an equivalent image sequence at the remote display.

Unlike the indeterminate sequence of drawing commands issued to the drawing processor over a given period, the image encoder processes a finite number of pixels within an image refresh period and the encoding function may be scheduled in a deterministic way. This allows for the design of a deterministic real time processor that operates independent of the actual image content. The memory access circuit is also simplified compared with that of the drawing processor. First, unlike the drawing processor, the image encoder operates largely on spatially correlated pixel data such as hextiles or frames which are linearly located. Second, the fact that memory accesses are deterministic allows for scheduled and sequenced operations using a simplified high speed circuit.

From an encoding function perspective, the image encoder detects temporal or spatial differences in an image in order to limit the encoded output to a stream of differential data where possible. The encoding function may also include spatial, temporal or frequency sub sampling to further reduce the data stream by removing less visible content. The image processor includes data comparison and data transformation circuits which look for data repetition and perform the compression functions. These circuits require only fixed point calculations and are therefore significantly simplified over the floating-point circuits used by the drawing processor. In addition to supporting integer operations, an efficient image encoder also supports high performance bitwise operations which are useful to enabling mask-orientated encoding of image data.

Finally, there is also a difference between the way a drawing processor and image encoder manage the state of the image in local memory. A drawing processor is tasked with rendering a new image based on changes in scene information. It is concerned with vertex changes in the original scene but unconcerned with the previous scene as finally drawn in the image memory. In contrast, an image encoder can take advantage of state history information associated with the image in memory. As one example, the encoder has knowledge of which physical areas of the image memory have changed as a result of the updated scene and encodes only those changes, resulting in effective image compression. As another example, the efficient encoder may deploy progressive build methods, applying different compression techniques to different areas of the image memory based on the characteristics of the image and how different areas are changing.

System Overview

Figure 3:
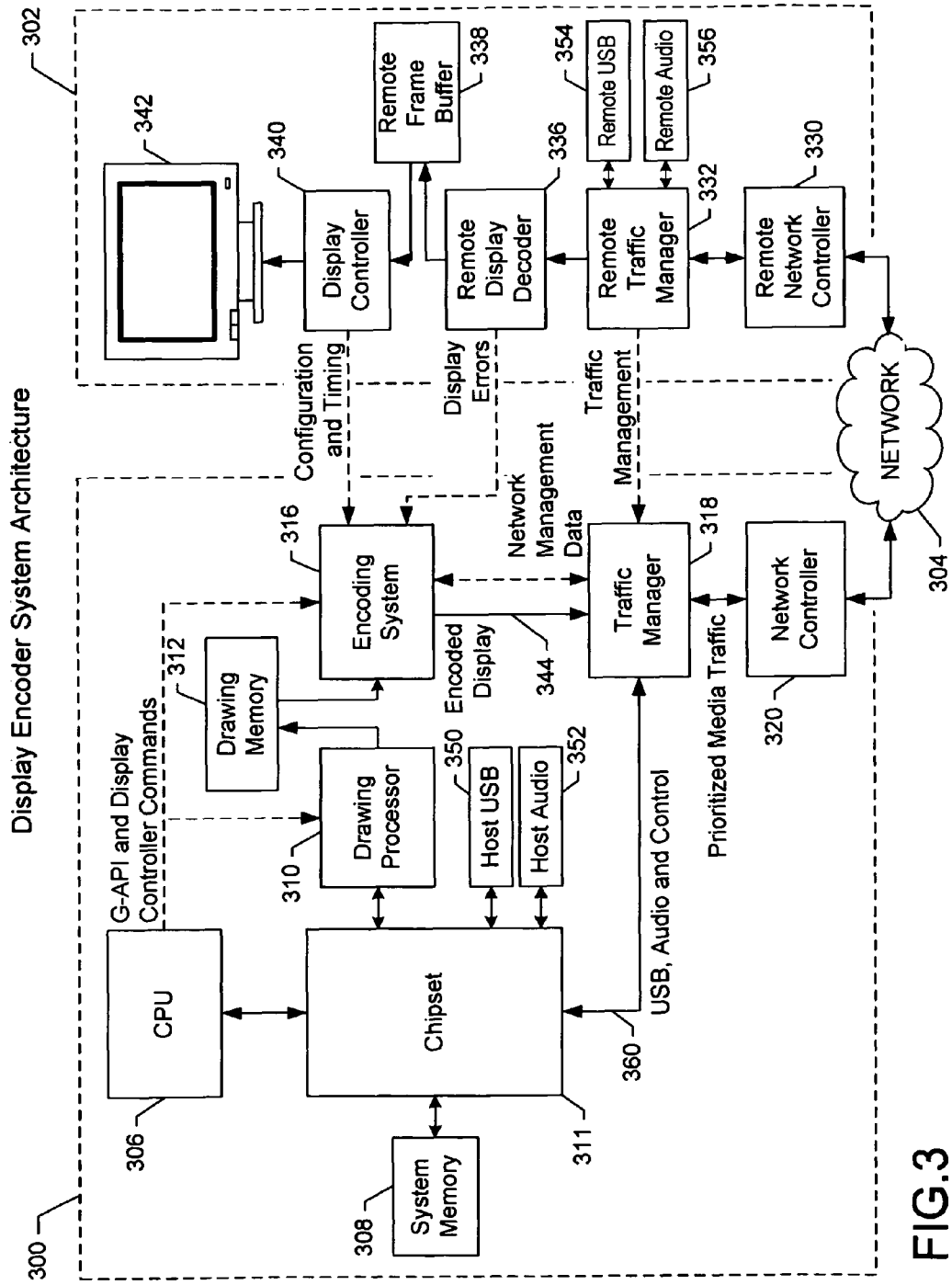
FIG. 3 illustrates a system architecture that enables the aggregation and transmission of display, audio and USB data between a data processing system and a remote user interface.

FIG. 3 illustrates a system architecture in accordance with embodiments of the present invention that enables the aggregation and transmission of display, audio and USB data between a data processing system and a remote user interface. Display images are rendered to a shared drawing memory by a graphic drawing system on the data processor before being encoded and aggregated. The encoding system monitors drawing commands issued by the CPU and interprets selective commands that enable the optimization of encoding methods. FIG. 3 provides a system view of an embodiment of the invention. The architecture shown enables the encoding, aggregation and transmission of display, audio and USB data between a data processing system and a remote user interface.

Host Apparatus Architecture

Referring to FIG. 3, host system 300 is connected to remote system 302 by network 304. Host system 300 is comprised of CPU 306 connected to system memory 308 and drawing processor 310 by chipset 311. Drawing processor 310 is connected to drawing memory 312 which incorporates one or more framebuffers. Drawing memory 312 may store any information associated with an image representation including image vector or pixel data, attributes, drawing commands, file information or other details pertinent to an image.

Host system 300 also includes other peripherals. In the embodiment shown, host USB controller 350 is connected to CPU 306 and system memory 308 by chipset 311. While a single CPU 306 is illustrated, it is to be understood that alternative embodiments where multiple CPUs are utilized in a cooperative arrangement can also be realized. Host USB controller 350 is bridged at the buffer management layer with remote USB system 354 to provide a synchronized data path that enables the communications of different traffic types including control and status packets in addition to packet transport of different USB data types such as isochronous and bulk data types. Host audio controller 352 is bridged at the buffer management layer with remote audio system 356 to provide synchronized communications of packetized audio data and audio control information between host and remote systems. In alternative embodiments, these functions may be implemented in software on the CPU or embedded in other host subsystems, including chipset 311 or encoding system 316.

In an embodiment, encoding system 316 is connected to drawing memory 312 so that it can read and encode sections of the display image in drawing memory 312. In the preferred embodiment, encoding system 316 has directly addressable access to a drawing memory that is used by drawing processor 310. In an alternative embodiment, drawing memory 312 may be part of system memory 308 connected to CPU 306 or chipset 311. In this alternative embodiment, encoding system 316 still has access to the drawing memory.

In the embodiment shown, the encoded display output from encoding system 316 is connected to traffic manager 318. Traffic manager 318 aggregates display data with other CPU or peripheral traffic and forwards it to network controller 320, which manages the transport of network packets from host system 300 to remote system 302. Network controller 320 also receives media streams such as audio, USB and control messages from remote system 302 which are forwarded to traffic manager 318, which in turn passes them to destination host USB controller 350 or audio controller 352.

In an alternative embodiment, network controller 320 and encoding system 316 are connected to chipset 311 using the system bus. In this embodiment, encoded display data 344 and network management data are communicated between network controller 320 and encoding system 316 over the system bus. In this embodiment, traffic manager 318 is not a necessary component of the encoding and transmission system.

Display Drawing, Encoding and Aggregation Methods

Display drawing operations are performed in the same way in the disclosed architecture as might occur in an architecture that excludes encoding functions. CPU 306 issues drawing commands to drawing processor 310, which renders display images in drawing memory 312. Encoding system 316 then accesses image sections from drawing memory 312 and compresses them using appropriate encoding methods as described below.

In an embodiment, the output of encoding system 316 is connected to traffic manager 318 as described above. Encoded image sections are forwarded from encoding system 316 to traffic manager 318 where they are prioritized and multiplexed with audio, USB and other control signals from CPU 306 or peripherals that are also destined for the remote system. Traffic manager 318 prioritizes the outgoing traffic based on the real-time demands of the image, audio and USB media streams and the attributes of the present image to ensure perceptually insignificant delays at remote system 302. As one example, display update information receives higher priority than bulk USB transfers. As a second example, outbound display updates are multiplexed with outbound audio data updates in situations where a portion of the display has been identified as a video sequence. This ensures that a video sequence remains synchronized with its audio channels. As a third example, each traffic type is allocated a fixed maximum bandwidth. For example, image data is granted 80% of the network bandwidth while audio and USB data are each allocated 10% of the available bandwidth. In the case where audio data meets its allocated bandwidth, a higher compression ratio may be activated. In the case of bulk USB data meeting its threshold, the USB data may be delayed until competing higher priority transfers have completed. In the case where image data exceeds its bandwidth, a different image encoding method that requires less bandwidth is used. Other methods are also possible, including real-time allocation to different traffic types based on traffic type and priority.

Traffic manager 318 also feeds network availability information back to encoding system 316 so that suitable encoding methods may be selected based on network conditions. This network availability information is determined by monitoring the bandwidth requirements of inbound and outbound USB and audio streams, monitoring error rates and receiving performance information provided by remote system 302 and optionally real-time network management equipment. In the embodiment shown, multiplexed media and control streams are encapsulated using an appropriate network protocol, for example UDP/IP in the case of an Ethernet network and are then forwarded to network controller 320. Network controller 320 then manages the physical and link-layer communication of the data streams to remote network controller 330 in the remote system.

Remote Apparatus Architecture

Remote network controller 330 manages the physical and link-layer communication of the data streams to and from host network controller 320. Remote network controller 330 forwards inbound traffic to remote traffic manager 332, which reconverts the aggregated streams from host system 300 into separate audio, USB and image streams. USB and Audio streams are directed to the remote USB/Audio system 334 and display image data is directed to remote display decoder 336. Remote traffic manager 332 also directs host-bound traffic from the USB/Audio system to remote network controller 330 for encapsulation and transfer.

The display data is decoded by remote display decoder 336 and stored in remote framebuffer 338. Alternatively, the image is stored directly in framebuffer 338 in compressed form and decoded by remote display decoder 336 in real-time as controlled by display controller 340. Display controller 340 accesses the image from framebuffer 338 and generates a timed display video signal, e.g. Digital Visual Interface (DVI) signal, which is used to drive remote display 342.

Network Management Overview

Network errors and bandwidth availability are managed at various protocol levels by different modules. At the physical and network protocol layers, the transport is managed between network controller 320 and remote network controller 330.

The status of network bandwidth availability is an important parameter for the encoding system. Remote traffic manager 332 monitors network congestion and availability based on the timing of received packets, sequence numbers and lost packets and periodically signals traffic manager 318 regarding network and data transfer status. Traffic manager 318 forwards this status information to encoding system 316, which is capable of adapting the encoding scheme in real-time based in part on bandwidth availability. Encoding system 316 also predicts future bandwidth requirements based on interpreted drawing commands described in detail below.

At a higher protocol layer, remote display decoder 336 can detect if image sections are corrupt, late or dropped. In these cases, remote display decoder 336 signals encoding system 316 that the section should be retransmitted. Encoding system 316 either retransmits the requested section or an updated version, depending on the availability of refreshed information in the drawing memory 312.

Shared Drawing Memory Architecture

Figure 4:
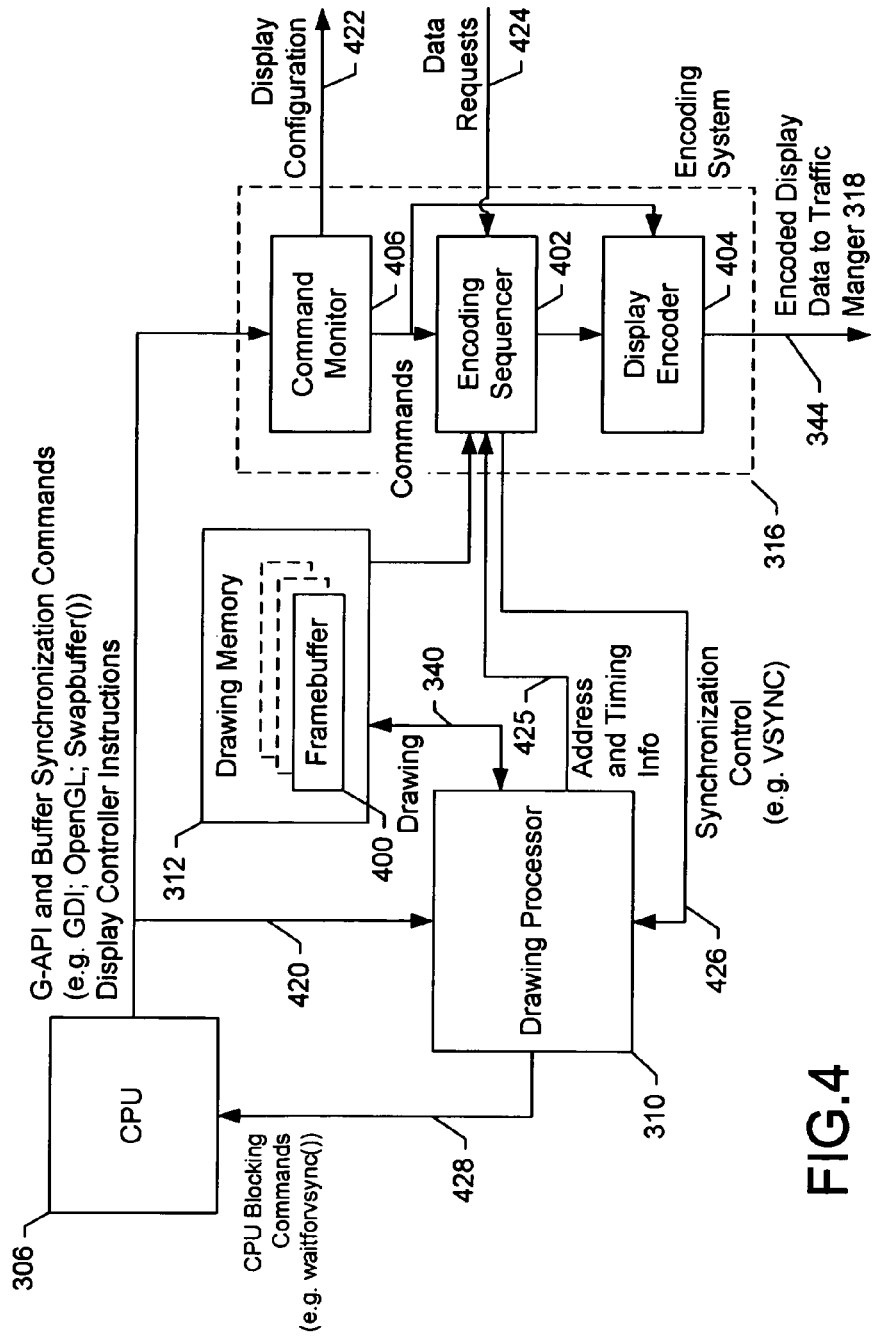
FIG. 4 illustrates the drawing command, image data and timing signal flow between the CPU, drawing processor and the encoding system.

FIG. 4 illustrates the image data, drawing command and timing signal flow between CPU 306, drawing processor 310 and encoding system 316. CPU 306 issues drawing commands to drawing processor 310, which renders the display image in one or more framebuffers within drawing memory 312. Encoding system 316 reads sections of the memory for encoding. Drawing memory 312 is connected to drawing processor 310 by one of several mechanisms. In the case of the preferred embodiment, they are connected by a high-capacity data bus. Alternatively, the graphic drawing system may be a hardware-acceleration function of the chipset or software function embedded within CPU 306. Drawing memory 312 may be an area of system memory 308 illustrated in FIG. 3.

Drawing memory 312 incorporates one or more framebuffers 400 that are used by drawing processor 310 to render and store display image frames. Drawing processor 310 draws into drawing memory 312 in the same manner as if an encoding system were not also connected to drawing memory 312, i.e. the rendering performance of the drawing system is not impacted by the presence of the encoding system.

In an embodiment, encoding system 316 is comprised of three modules. First, encoding sequencer 402 has read access to drawing memory 312 and responds to requests for updated display sections by reading the requested sections from the drawing memory. Second, display encoder 404 is connected to the output of the encoding sequencer and compresses sections of the display image using several means described below. Third, command monitor 406 has access to the drawing commands issued by CPU 316. The command monitor may either be a software function executing on the CPU, and/or a dedicated function or functions embedded within encoding sequencer 402 and display encoder 404. In the preferred embodiment, the display encoder is a dedicated hardware module but it is equally feasible to embed the functionality either as hardware or software (or a combination) within drawing processor 310 or CPU 306.

Encoding Methods

Encoding sequencer 402 uses synchronized timing means to access pixels, blocks, lines, frames or other sections of image from a framebuffer in the drawing memory. This access is initiated by any of several mechanisms, including incoming requests from remote display decoder 424 or locally generated timing. In the preferred embodiment, regions of the framebuffer are read on request by remote display decoder 424 only after drawing processor 310 has signaled that the rendering of the current frame is complete, using framebuffer timing signal 425. An example would be to delay the encoding of a frame until the completion of a raster operation move, so as to prevent the tearing of the image when it is encoded.

In an alternative embodiment, the drawing command stream rate at which the application on CPU 306 calls drawing processor 310 is controlled (e.g. using CPU blocking commands 428) so that drawing memory 312 is updated at a rate that matches the image throughput rate. The optimum frame update rate is determined by identifying image throughput bottlenecks. In one embodiment, the bottleneck is identified by comparing the throughput of the drawing, encoding, transmitting and decoding functions and the rate at which drawing commands are issued is controlled to match the slowest throughput. In another embodiment, the encoding method is selected so that the transmission rate matches the slowest of the drawing command throughput rate, the encoding rate and the decoding rate.

In an embodiment, framebuffer timing signal 425 is used to establish the frame update rate used by the encoder. In embodiments where network bandwidth is unconstrained, framebuffer 400 is read by encoding system 316 prior to the drawing processor flagging the completion of the rendering operation. In this case, encoding system 316 encodes and transmits the image prior to drawing completion. In this alternative embodiment, encoding system 316 keeps track of drawing changes that occur after the section of framebuffer and transmits these changed sections after the drawing processor signals the availability of the rendered image. The advantage of this method in systems with a high availability of network bandwidth is that even though some data may be transmitted twice, the pre-encoding and pre-transmission of image sections reduces the overall latency between the rendering and remote display operations.

Encoding sequencer 402 then reads the requested image segment and forwards it to display encoder 404 for compression. Encoding sequencer 402 also emulates a local display controller 340 by providing timing signals (e.g. VSYNC signal 426) for drawing processor 310. Command monitor 406 filters drawing commands 420 issued by CPU 306 to drawing processor 310 for useful information that may facilitate or optimize display encoding. Useful information includes an understanding of image type, co-ordinates, image quality, display priority (i.e. latency) and other attributes of the display.

Display encoder 404 uses this knowledge gained from the drawing commands that have been forwarded by command monitor 406 and additional knowledge of which areas of the framebuffer have been updated to compresses image sections or changed areas of the image sections.

Command monitor 406 also monitors CPU 306 source commands for display setup parameters, configuration instructions and timing requirements including display refresh rates etc. issued to display controller and forwards this information to remote display controller 340. Timing requirements are forwarded to encoding sequencer 402 which uses the information to provide emulated timing for the drawing processor (e.g. generating VSYNC signal 426). In cases where the application is blocked based on the completion of drawing operations (e.g. a waitforvsync( ) function call), CPU 306 is fully abstracted from the fact that the VSYNC is generated by the encoding system. Encoding system 316 determines the timing of drawing processor 310 but in the case of a blocking command, the token is returned by the drawing system to CPU 306 on command completion as would normally occur.

Power Saving Method

Command monitor 406 may initiate a low power state based on the absence of drawing commands. For example, the framebuffer access circuit may be temporarily disabled if the framebuffer is not being updated.

Command Monitor Method

Figure 5:
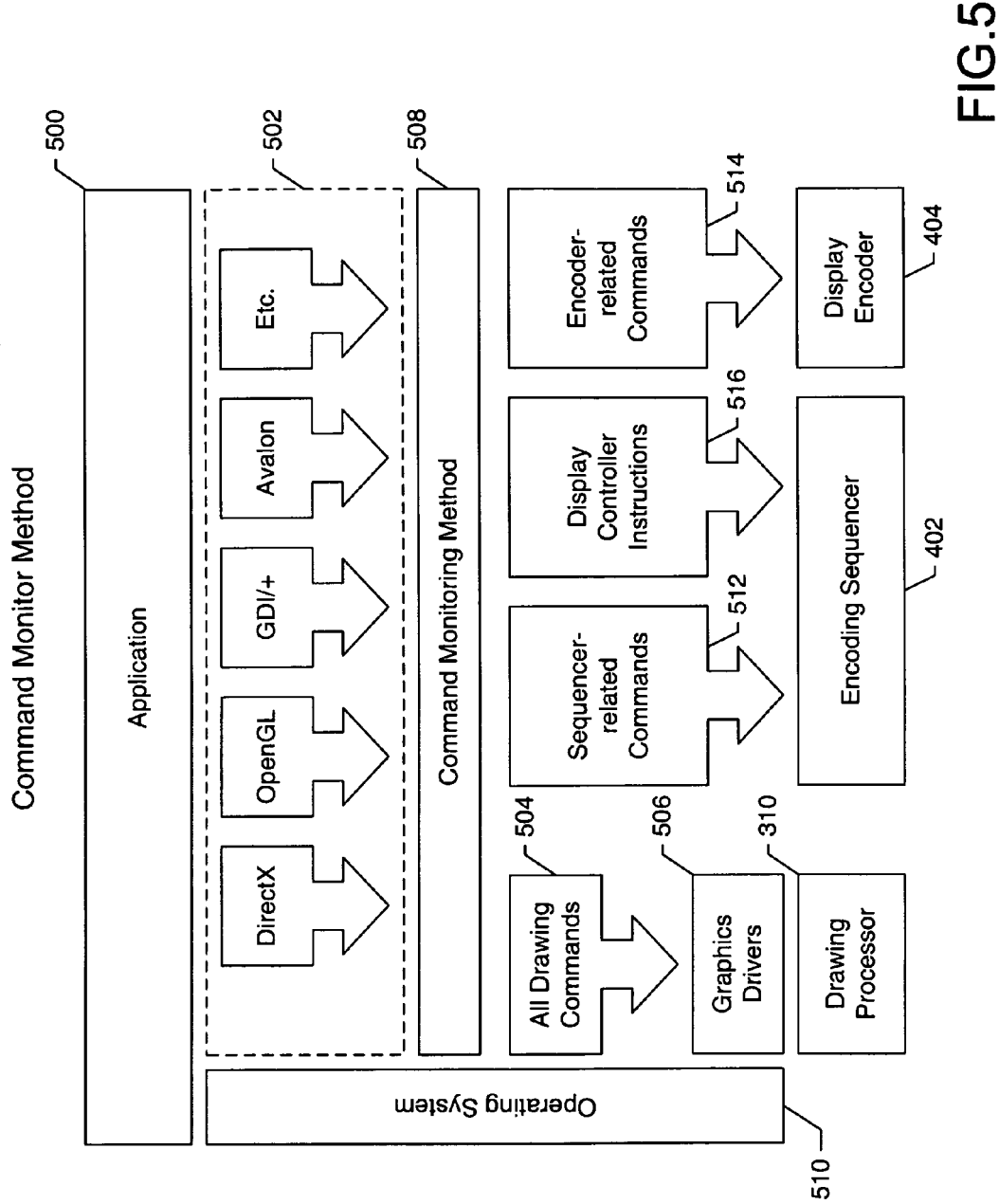
FIG. 5 illustrates a in block diagram form a software architecture on the CPU of a data processor that enables the monitoring and selective filtering of drawing commands issued by the host application for use by the encoding system.

FIG. 5 illustrates a CPU software architecture for host system 300 that enables the monitoring and selective filtering of drawing commands issued by the host application for use by the encoding system. Referring to FIG. 5, application 500 on CPU 306 uses a variety of application interfaces (APIs) 502 to issue graphics instructions 504 to graphics driver 506, drawing processor 310 or a drawing process, either internal or externally to the CPU. These instructions include all possible graphics drawing instructions from simple and direct pixel placement commands such as BitBlt( ) to sophisticated 3D shading and lighting commands such as are available in the OpenGL API, or video commands such as those available in Microsoft's DirectShow API that control the properties of video sequences displayed on a computer monitor. Examples of useful drawing commands from various APIs are listed in Tables 1-9.

The image is intended to be drawn to a framebuffer in the same way as a system without the presence of an encoding system. When a drawing API function is called, a graphic instruction is issued to graphics device driver 506 that interprets the instruction for the specific hardware implementation of the drawing processor. The present invention may include an additional command monitoring software processing layer 508 between drawing command API 502 and graphics driver 506. The drawing command monitor issues the command to the drawing processor (via the graphics driver) and forwards selective duplicate commands to encoding sequencer 402 and display encoder 404.

Command monitor 406 extracts and forwards only the essential elements of the drawing commands. Sequencer-related commands 512 include useful hints based on what part of the image is being drawn while encoder-related commands 514 describe properties of the image which may influence the selection of encoding method. Command monitor 406 also monitors operating system 510 for system commands and display setup and configuration instructions 516 destined for the display controller. Configuration instructions are forwarded to the remote display controller while synchronization instructions that synchronize image updates with the display refresh rate are sent to the encoding sequencer to enable the appropriate framebuffer to be encoded, transmitted, decoded and displayed at the remote display 342.

Encoding Sequencer Architecture

Figure 6:
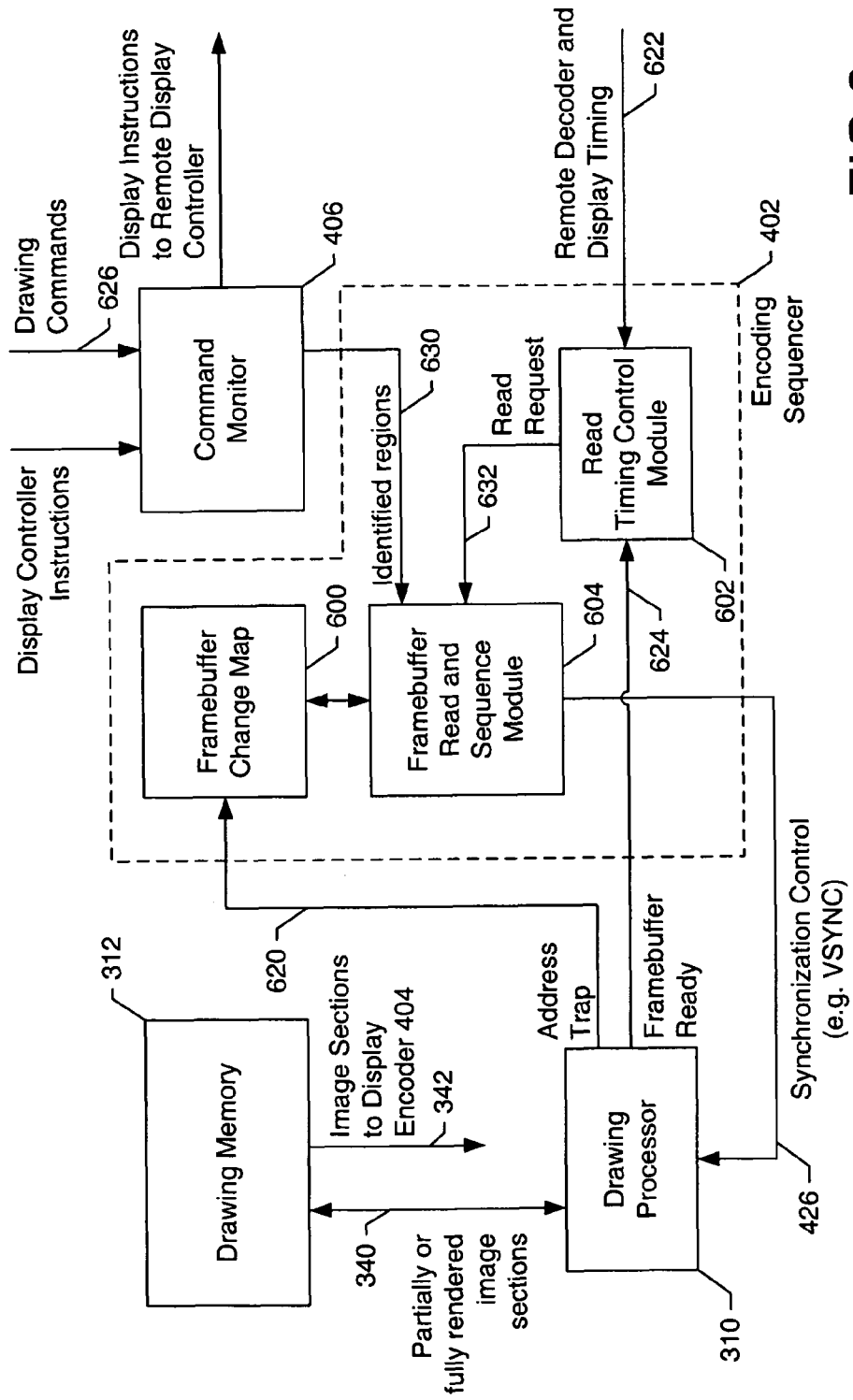
FIG. 6 illustrates an encoding sequencer that replaces the traditional function of the raster-based display controller found in a typical local display environment.

FIG. 6 shows the architecture of encoding sequencer 402 and connections to other modules and systems that enables encoding sequencer 402 to replace the traditional function of the raster-based display controller found in a typical local display environment.

In an embodiment, the encoding sequencer is comprised of three functional modules. First, framebuffer change map 600 is a map of bits corresponding to bitmapped framebuffer locations in the drawing memory. When drawing processor 310 updates a framebuffer, address information is captured (reference numeral 620) and bits in the map are set to indicate areas or pixels of the framebuffer that have been updated since the last time that the framebuffer was accessed by the encoding sequencer. The bits in the map are cleared before the corresponding areas of the framebuffer have been read. This ensures synchronization and allows the bits to be set again by additional changes before the encoding is complete.

Second, read timing control module 602 controls the timing of framebuffer accesses. At a system level, the timing is designed to ensure that the encoding function, data transfer and decoding function are completed just ahead of the associated part of the display image being accessed by the remote display controller. This minimizes the latency between the time the image is first written to the host framebuffer and the time the image is displayed. To accomplish this, read timing control module 602 generates a timing rate that is an early copy of the remote display controller timing rate by responding to remote requests for updated display sections 622. When read timing control module receives a block read request from remote display controller 340, it signals the framebuffer read and sequence module that a read operation is due. Framebuffer change map 600 then indicates pixels in the framebuffer that have been updated and these may be read. Read timing control module 602 also receives framebuffer ready flag 624 which is asserted by the drawing processor once a framebuffer has been rendered and signals the earliest time that a framebuffer is available for reading. In one alternative embodiment, reading of the framebuffer occurs ahead of the ready signal as described above. In another embodiment, this timing information is provided by drawing commands 626 such as swapbuffers( ) or flush( ) captured by command monitor 406 and forwarded to encoding sequencer 402 rather than using hardware signaling between drawing processor 310 and read timing control module 602. In another embodiment, read timing control module 602 makes dynamic timing decisions based on the combination of remote decoder display timing 622, framebuffer ready flag 624 and image status information as determined by drawing commands 626.

A local periodic master timer provides an alternative method for controlling the read timing. In this case, the remote display controller operates asynchronously to the encoding sequencer or as a slave to the timing of encoding system 316.

Third, the framebuffer read and sequence module 604 reads the framebuffer when instructed by read timing control module 602. The module reads sections of the framebuffer identified for access based on framebuffer change map 600 and interpreted drawing commands. For example, the priority of read operations may be influenced by interpreted drawing commands (e.g. a priority request based on an OpenGL priority hint). Other drawing commands such as bitblt( ) and scrolling functions are also useful to framebuffer read and sequencing module 604 in determining when some areas of the framebuffer should be read as a priority and which areas should be read so that these updates can occur quickly.

Framebuffer read and sequence module 604 also generates synchronization signals 426 for drawing processor 310 such as the vertical retrace and blanking signals by using the ability of read timing control module 602 to synchronize with the timing of the remote display.

Encoding Sequencer Method

Figure 7:
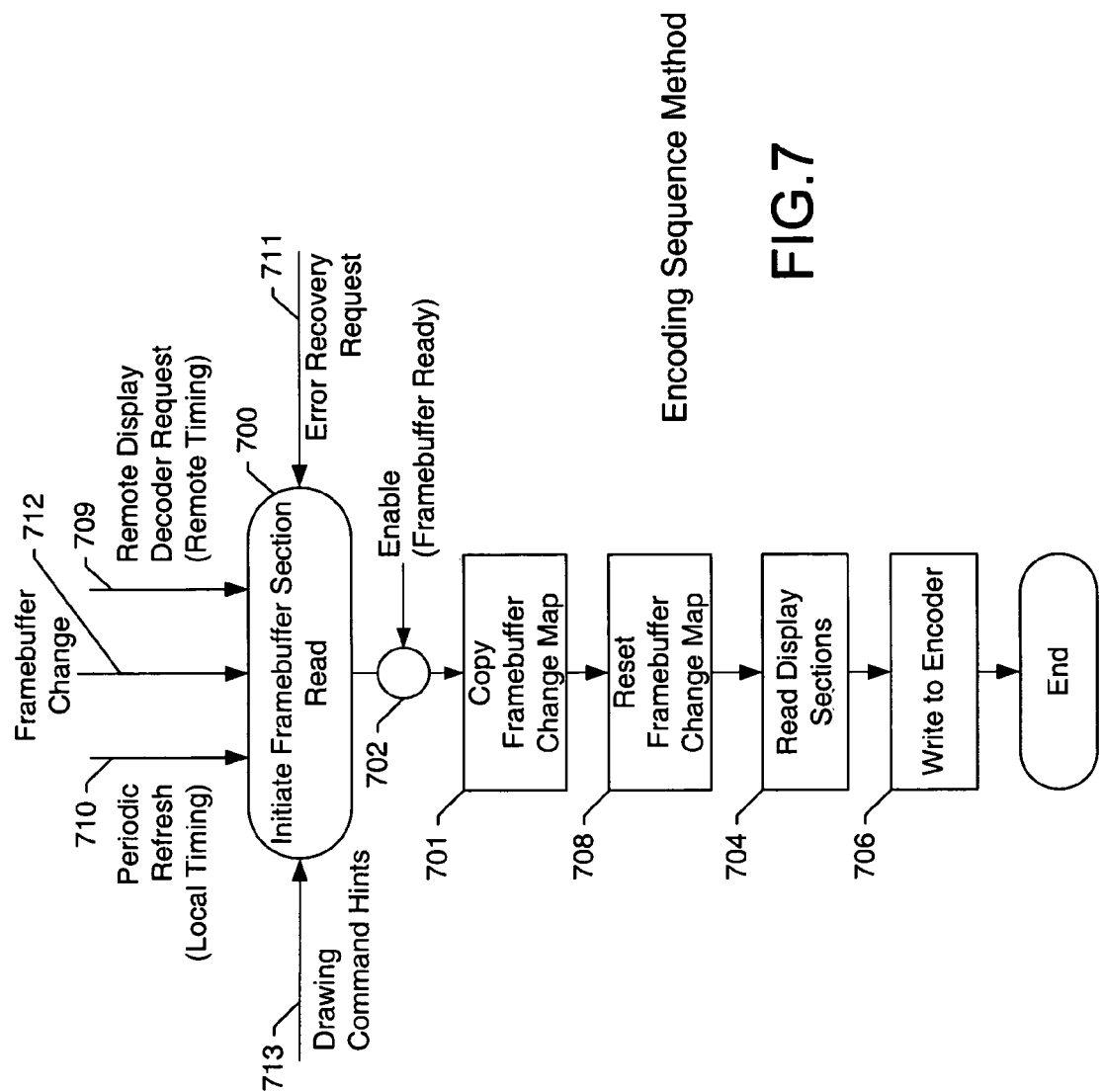
FIG. 7 is a flowchart that illustrates the method used by the encoding sequencer to determine when sections of the framebuffer should be accessed.

FIG. 7 is a flowchart that shows the method used by the encoding sequencer to determine when sections of the framebuffer should be accessed. Framebuffer read operations are initiated 700 by any of several mechanisms. First, a read operation may be initiated by a request from remote display controller 709 in the case where the remote display controller is the display timing master. Second, it may be initiated on a periodic refresh request 710 (e.g. from a local clock or the drawing processor 310) in the case where encoding sequencer 402 determines the system timing. Third, initiation may be on request from remote display decoder 336 in the case where an error has been detected for previous transmission 711.

Depending on the nature of the error, retransmission may be limited to previously transmitted data, or recently updated parts of the framebuffer may be read and transmitted or the entire framebuffer may be read and transmitted.

Additionally, the framebuffer may be read on a framebuffer change map hit 712 either on a periodic scan or when the framebuffer is written. As described, interpreted drawing command hints 713 may be used to prioritize the sequence of the read function in the case where multiple blocks are available for access.

In the embodiment where drawing processor 310 is able to flag encoding sequencer 402 when the framebuffer has been written, the framebuffer is read once a request is received and the framebuffer is released by drawing processor 310 and available for reading (reference numeral 702). Alternatively, in the case of a host system with a single framebuffer, encoding sequencer 402 may access the framebuffer asynchronously to the rendering function.

Once initiated, the frame buffer change map is copied (act 701) and reset (act 702). The sections, pixels, lines, blocks or frames identified in the buffer change map copy are then accessed 704, assembled with other information described above and forwarded to the display encoder 706.

Display Encoder Architecture

Figure 8:
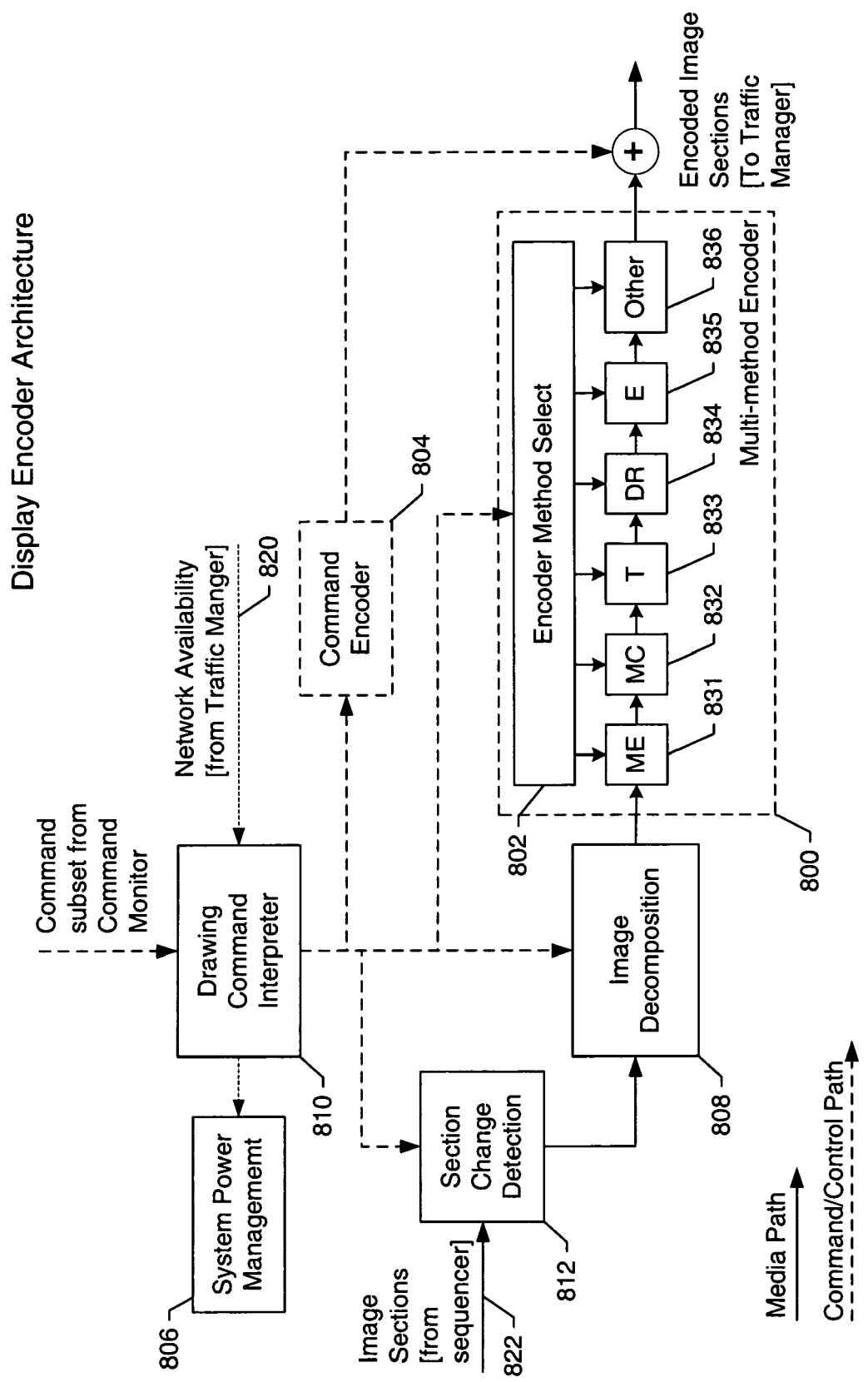
FIG. 8 illustrates the internal architecture of the display encoder that decomposes and compresses the display sections based on drawing commands interpreted from the command monitor.

FIG. 8 illustrates the internal architecture of an embodiment of the display encoder that decomposes and compresses the display sections based on drawing commands interpreted from the command monitor. The display encoder is comprised of several modules. Multi-method encoder 800 includes an enhanced image encoding pipeline, including motion estimation (ME) 831, motion compensation (MC) 832, discrete cosine transform DCT and/or discrete wavelet transform DWT stage (T) 833, data reordering stage (DR) 834, entropy (E) 835 encoding stage and possible other stages 836. The data reordering stage includes lossless data reordering operations e.g. color cache, LZW, run length coding, mask or data predictors, etc. The entropy encoding stage uses suitable encoders like arithmetic, Golumb or Huffman coders. The stages are controlled by encoder method selector 802 that selects encoding combinations to support different image content including lossy methods for natural images or lossless methods computer generated text or graphic images. The encoder may also be tunable to different variations in image content such as color depth, etc.

The encoder architecture includes command encoder 804 that may be used to transfer some display commands to the remote display rather than processing them locally. One example is the pointer or sprite overlay, which might be implemented using the remote display controller. As a second example, encoding system 316 may encode one or more pre-defined sub-regions of drawing memory 312 as determined by interpretation of drawing commands. The sub-regions are transmitted to remote system 302 with a subset of drawing commands. In this embodiment, remote system 302 then determines display arrangement details such as which window should be overlaid. In a variation on this embodiment, predefined sub-regions of drawing memory 312 from different host systems 300 are transferred to remote system 302. Remote system 302 then determines the integration of display windows from the different host sources.

The encoder architecture includes system power management module 806 which is capable of reducing the power or shutting down elements of the multi-method encoder based on framebuffer change activity and the encoding method being used. In one embodiment, motion estimation circuit 831 is disabled when there is no motion. Examples of useful drawing commands are shown in TABLE 9.

Image decomposition module 808 is used to classify the image type as a precursor to the encoding operation to facilitate encoding based on image classification. Image decomposition module 808 classifies the image into different image types such as background, text, picture or object layers based on spatial and temporal features such as contrast, color content, etc. Image type may be determined using image analysis methods or interpreting drawing commands. An example of an image analysis method is an image filter such as a text recognition filter. A selective list of drawing commands that identify image type are listed in Table 2. The layers are then subjected to different encoding methods that may include items such as different entropy encoders or context selection for entropy encoders.

Drawing command interpreter 810 interprets drawing commands that may enhance the image decomposition process. In one embodiment, a drawing command identifies a section of the display as a video sequence which allows the decomposition function to classify the defined region as a picture or natural image region, independent of the contrast features of the region. If the video sequence displays text, it may be desirable to classify the text overlay as either picture or text dependent on other attributes of the video sequence. This enhanced classification is used to optimize the trade-off between image quality and network bandwidth limitations.

In another embodiment of a method for encoding an identified video sequence, additional drawing command information relating to the video such as blocking information, motion vectors and quantization levels are captured and used to select the blocking information, motion vectors and quantization levels of the encoding method. If the parameters are perfectly matched, the image may be encoded at a quality level and bandwidth comparable to the original video sequence.

In another embodiment that uses drawing commands to enhance the decomposition process, font copy commands indicate the presence of text, fill commands indicate the presence of background and texture-related commands indicate textured regions.

Another method for taking advantage of drawing command hints identifies the status of changes to image areas and selects an encoding method based at least in part on change status information. In this embodiment, a drawing command signals section change detection module 812 as to areas of the inbound image sections from encoding sequencer 822 that have changed and therefore require encoding and transmission. Block change, pixel change and motion vector commands all provide status information used to identify status changes.

Another method for taking advantage of drawing command hints attempts to improve the efficiency of encoding. In this embodiment, drawing commands are used as hints in order to improve the efficiency of the encoder without compromising image quality. In instances where incorrect predictions are made based on the hints, the image is encoded and transmitted using a higher bandwidth than predicted, but without sacrificing quality.

Another method for taking advantage of drawing command hints prioritizes the encoding sequence and influence the encoding quality. As listed in Tables 3 and 8 below, OpenGL drawing commands provide quality and performance hints which provides insight into the quality and performance intended by the application and the encoding method may be set accordingly.

Encoder Selection Methods

In an embodiment, encoder method selector 802 selects an appropriate encoding method based on various established criteria. Compression is based on the type of image. Drawing commands may be interpreted to understand attributes of the different sections of the display (based on interpreted drawing commands), where sections may have regular or arbitrary pixel boundary shapes. The commands may be used to identify areas as background, text, photographs, video etc. Each region may then be encoded using an optimum encoding method.

Compression is also based on network availability as indicated by traffic manager 318. Traffic manager 318 determines network bandwidth based on availability information from remote traffic manager 332 and feeds this back to encoding system 820. Drawing command interpreter 810 then determines the most effective encoding process based on the combination of the current encoding process, quality requirements, how much of the image is changing as indicated by drawing commands and the available network bandwidth as indicated by traffic manager information. For example, in one embodiment of the invention, 10% of the bandwidth availability is allocated to USB traffic, 10% is allocated to audio traffic and the remaining 80% is granted to image data traffic. In this embodiment, the image encoding method is changed when the image data is predicted or measured to exceed its allocated 80% bandwidth.

Based on the desired quality level and the network availability, for example as indicated by traffic manager 318, suitable encoding methods may be selected. For each image type (e.g. picture, video, text, etc.), a lookup table may be used either to determine the bandwidth required (in bits/sec) to achieve a given quality or the quality (in bits/pixel) achievable for a unit of image area using a given bandwidth. In cases where bandwidth is limited due to low network availability or frequent screen changes over a large area, a higher compression mode may be selected or progressive build sequence may be used. In the case of progressive build, a relatively low network bandwidth is used to transfer a baseline image or image section of perceptually acceptable quality over a short period of time. Assuming the image or section does not change, more detail is added to the original baseline over time using small amounts of network bandwidth until the image reaches a perceptually lossless quality level. Progressive build methods are typically applied at different times and different rates to different sections of an image dependent on quality requirements and how each section is changing. As a result, at any given time the different sections of an image will be at different progressive build states.

In the case of an actively changing image, knowledge of the area of the image that must be updated and an indication of the type of image provides significant information on how much data will be generated when the changing image is encoded. This information may be used in context with information from the traffic manager to modify the encoder method selection. As one example, a low bandwidth encoding method such as lossy encoding may be applied to the changing image in the case of low network availability. As a second example, a higher bandwidth encoding method may be applied to the changing image in the case of high network availability.

Image Processing Load Balance Method

In an architecture that shares processing resources between drawing and compression functions (for example a CPU architecture with a single graphic processing unit or drawing processor used for both compression and drawing functions), the processing resource is actively balanced between updating the image (e.g. rendering activities) and updating the remote display (e.g. compression activities). The processing load is balanced in such a way as to equalize all processing-based and transmission-based bottlenecks at a minimum level across the data path.

One example is the case where the framebuffer update rate is higher than the frame transfer rate. In this case, the framebuffer update rate may be decreased to balance the compression transfer rate. If the same resources are used, lowering the framebuffer update rate may have the desirable effect of increasing the frame transfer rate. A second example is the case where the framebuffer update rate is lower than the frame transfer rate. In this case the transfer rate may be lowered to balance the framebuffer update rate. Similarly, if the same resources are used, lowering the transfer rate may increase the frame update rate with an overall effect of improving the new frame rate.

Figure 9:
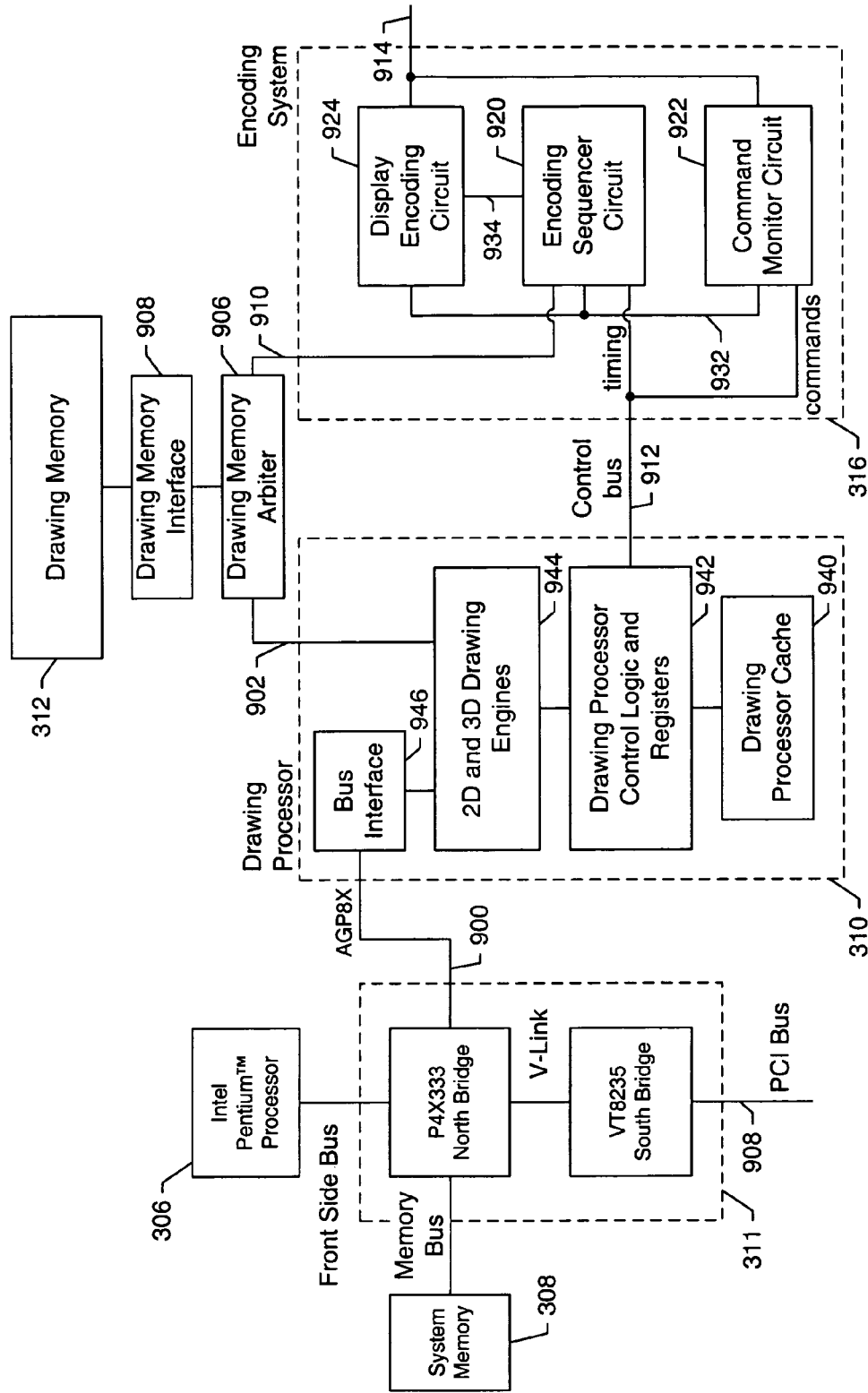
FIG. 9 illustrates in block diagram form a hardware circuit embodiment of a drawing processor and display encoding system with access to a shared drawing memory.

FIG. 9 shows a physical embodiment of encoding system 316 connected to drawing processor 310, drawing memory 312 and CPU chipset 311. FIG. 9 illustrates a hardware circuit implementation of encoding system 316, where encoding sequencer circuit 920 is a circuit implementation of encoding sequencer 402, command monitor circuit 922 is a circuit implementation of command monitor 406 and display encoding circuit 924 is a circuit implementation of display encoder 404.

In the embodiment, drawing processor 310 is connected to chipset 311 by AGP 8X graphics bus 900. In alternative embodiments, drawing processor 310 may be connected to chipset 311 using PCI-Express or other high bandwidth interconnects.

Drawing processor 310 uses image bus 902 to write rendered images into drawing memory 312. As encoding sequencer circuit 920 also accesses drawing memory 312, access between the competing resources is arbitrated by drawing memory arbiter 906.

The arbitration method used is based on the need to satisfy the requirement to grant encoding system 316 memory access based on its strict timing requirements while also accommodating the variable requirements of drawing processor 310. In one method of arbitrating between the two resources, drawing processor 310 is granted a fixed priority and encoding system 316 is granted a low priority. Encoding system 316 monitors the actual encoding rate in comparison with the desired encoding rate, as determined by the frame update rate. If the encoding system exceeds a time lag threshold, it signals drawing memory arbiter 906 to change its priority. In one embodiment, drawing memory arbiter 906 increases memory burst sizes when encoding system 316 is granted higher priority but other methods of improving access efficiency are possible too. Once encoding system 316 exceeds a lead time threshold, it is once again granted a low priority and burst size is reduced. As a result, encoding system 316 maintains a desirable memory access priority without impeding drawing processor 310.

Drawing processor 310 also has control bus 912, with timing signals such as synchronization and control signal 426 and framebuffer ready signal 624 previously described connected to encoding sequencer circuit 920. It also carries drawing commands 626 and display controller instructions captured by command monitoring method 508 destined for command monitor circuit 922. As previously described, these commands typically originate from CPU 306. Drawing processor 310 receives the commands across data bus 900 and forwards them to command monitor circuit 922. In an alternative embodiment, drawing commands are stored in drawing memory 312 and are directly accessible by command monitor circuit 922.

Drawing Memory Bandwidth Reduction Methods

The present invention provides a number of methods for lowering the memory bandwidth requirements between encoding system 316 and drawing memory 312. One method is the result of fewer memory reads as determined by framebuffer change map 600. As described, framebuffer change map 600 indicates which memory areas have been updated so that memory areas that have not changed do not need to be re-read. Another method involves the interpretation of drawing commands by command monitor 406. Drawing commands provide which may provide an indication of the type of image in a given area and how it is changing. Framebuffer read and sequence module 604 may then limit memory access based on status information. As one example, a rapid changing video sequence may be read at a reduced frame rate. Another method for reducing memory bandwidth takes advantage of drawing processor cache memory 940. While the embodiment described in FIG. 9 reads image sections from drawing memory 312 once image sections have been updated, this may not always be ideal. For example, in applications such as video sequences that occupy a large display area, the rendering function demands a high proportion of the available bandwidth of image bus 902. In such applications, it may be desirable to reduce the competing bandwidth requirements of encoding system 316. One method to achieve this is to provide encoding system 316 with access to drawing processor cache memory 940. In such an embodiment, image sections are encoded directly from drawing processor cache memory 940 rather than external drawing memory and this reduces maximum bandwidth requirements of memory interface 908.

Figure 10:
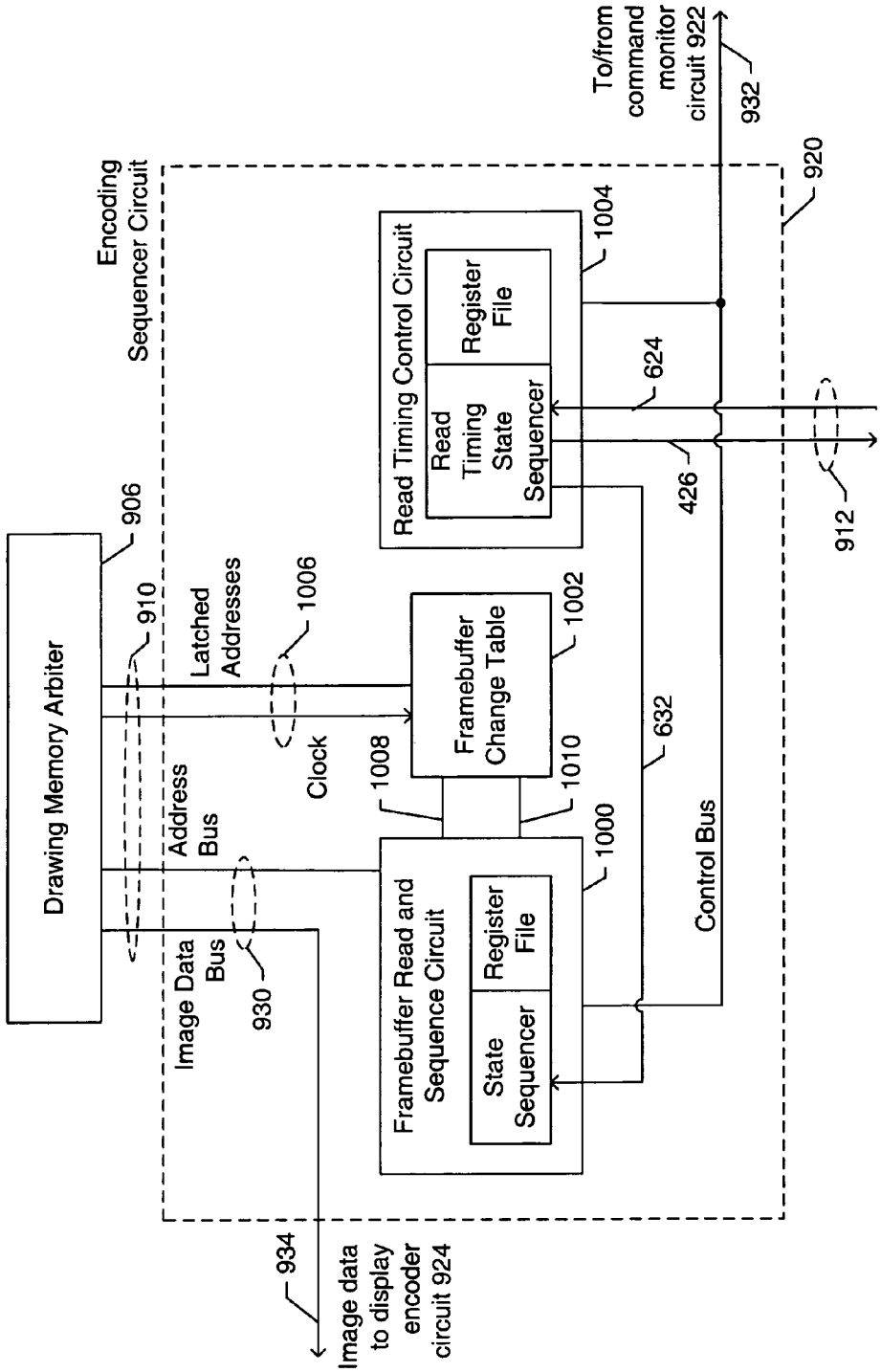
FIG. 10 illustrates in block diagram form a hardware circuit embodiment of an encoding sequencer circuit connected to a drawing memory arbiter.

FIG. 10 shows a physical view of encoding sequencer circuit 920. Framebuffer read and sequence circuit 1000 is a hardware circuit implementation of framebuffer read and sequence module 604, framebuffer change table 1002 is a hardware circuit implementation of framebuffer change map 600 and read timing control circuit 1004 is a hardware circuit implementation of read timing control module 602, all previously described.

When drawing processor 310 (on FIG. 9) updates areas of drawing memory, framebuffer change table 1002 latches the accessed addresses across bus 1006 and stores them in a single bit table. In an embodiment where multiple display are supported, a bitmap is allocated for each remote display which enables encoding system 318 to explicitly track information on which displays have received which update information. The added bitmap support for tracking of updates, to multiple displays allows the implementation of equitable bandwidth and encoder resource sharing methods as well as transmission prioritization based on image content attributes.

Command monitor circuit 922 uses control bus 932 to write the description of identified image regions (previously described 630) to the register file of framebuffer read and sequence circuit 1000. On read request command 632 from read timing control circuit 1004, framebuffer read and sequence circuit 1000 accesses framebuffer change table 1002 from bus 1008 to determine which sections of the image have changed. Framebuffer read and sequence circuit 1000 reads the relevant sections of drawing memory 312 (on FIG. 9) using image bus 910 and resets framebuffer change map using reset signal 1010. In an embodiment where multiple displays are supported, only the bitmap relating to the current display is reset. Image data is read directly into display encoder circuit across image bus 934 shown.

Read timing control circuit 1004 uses a state sequencer to generate timing control signal 426 for drawing processor 310 and read timing signal 632. Timing requirements are derived from remote decoder timing requests written across control bus 932 to the register file of read timing control circuit 1004 (622 previously described) as well as framebuffer ready signal 624 in the case of an embodiment with multiple framebuffers.

Figure 11:
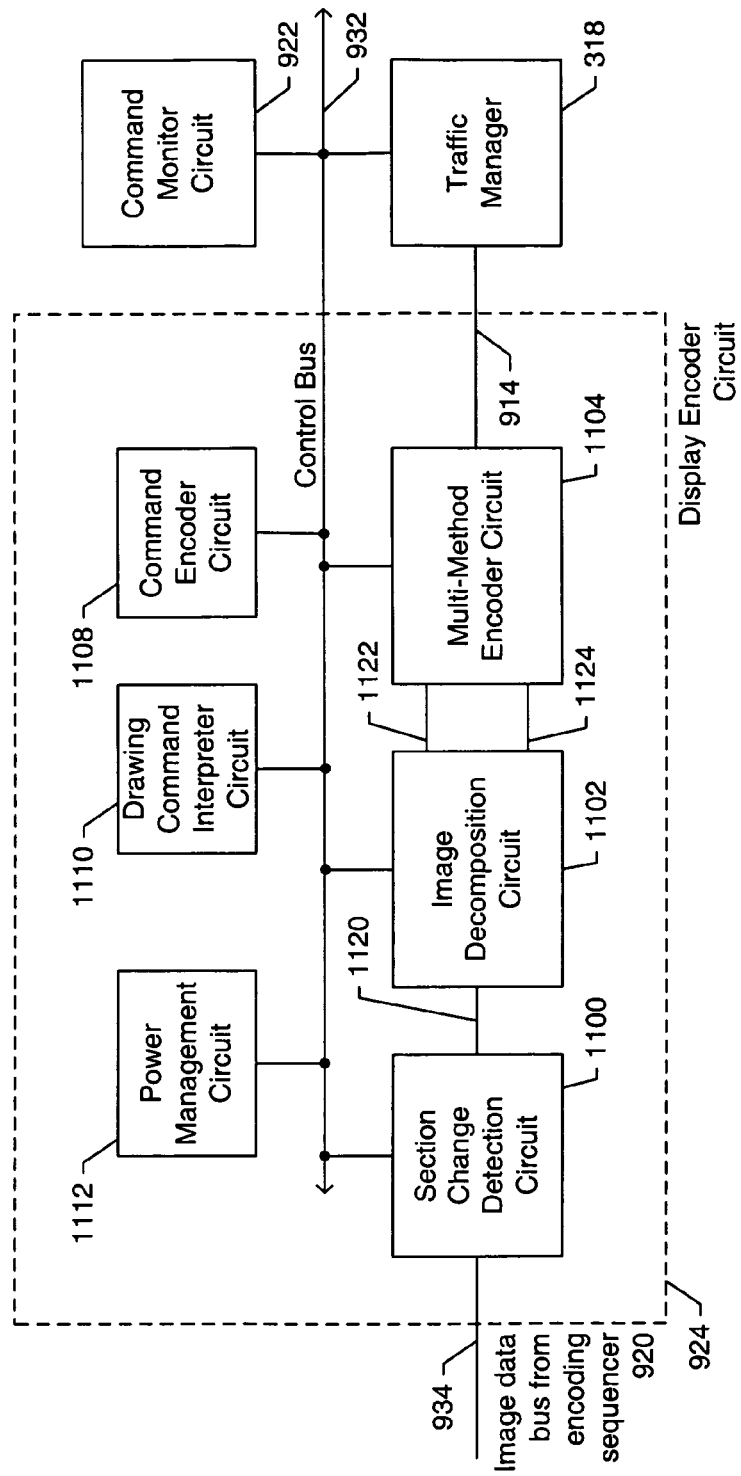
FIG. 11 illustrates in block diagram form a hardware circuit embodiment of a display encoder circuit that encodes selected image areas.

FIG. 11 shows a physical view of display encoder circuit 924. Section change detection circuit 1100 is a hardware circuit implementation of section change detection module 812, image decomposition circuit 1102 is a hardware circuit implementation of image decomposition module 808, multi-method encoder circuit 1104 is a hardware circuit implementation of multi-method encoder 800, command encoder circuit 1108 is a hardware circuit implementation of command encoder 804 and drawing command interpreter circuit 1110 is a hardware circuit implementation of drawing command interpreter 810.

Incoming commands from command monitor circuit 922 are interpreted by drawing command interpreter circuit 1110 and distributed across control bus 932 to system power management circuit 1112, section change detection circuit 1100, image decomposition circuit 1102, multi-method encoder 1104 and command encoder 1108. Drawing command interpreter circuit 1110 also receives network availability information (820 previously described) from traffic manager 318 across control bus 932. In the embodiment shown, change detection circuit 1100 reads updated image sections across data bus 934 when the relevant sections are addressed by encoding sequencer circuit 920 as described above. The image is encoded by the image processing pipeline comprising circuits 1100, 1102, and 1104 using methods described by FIG. 8. Encoded image data is then forwarded to traffic manager 318 across data bus 914.

Figure 12:
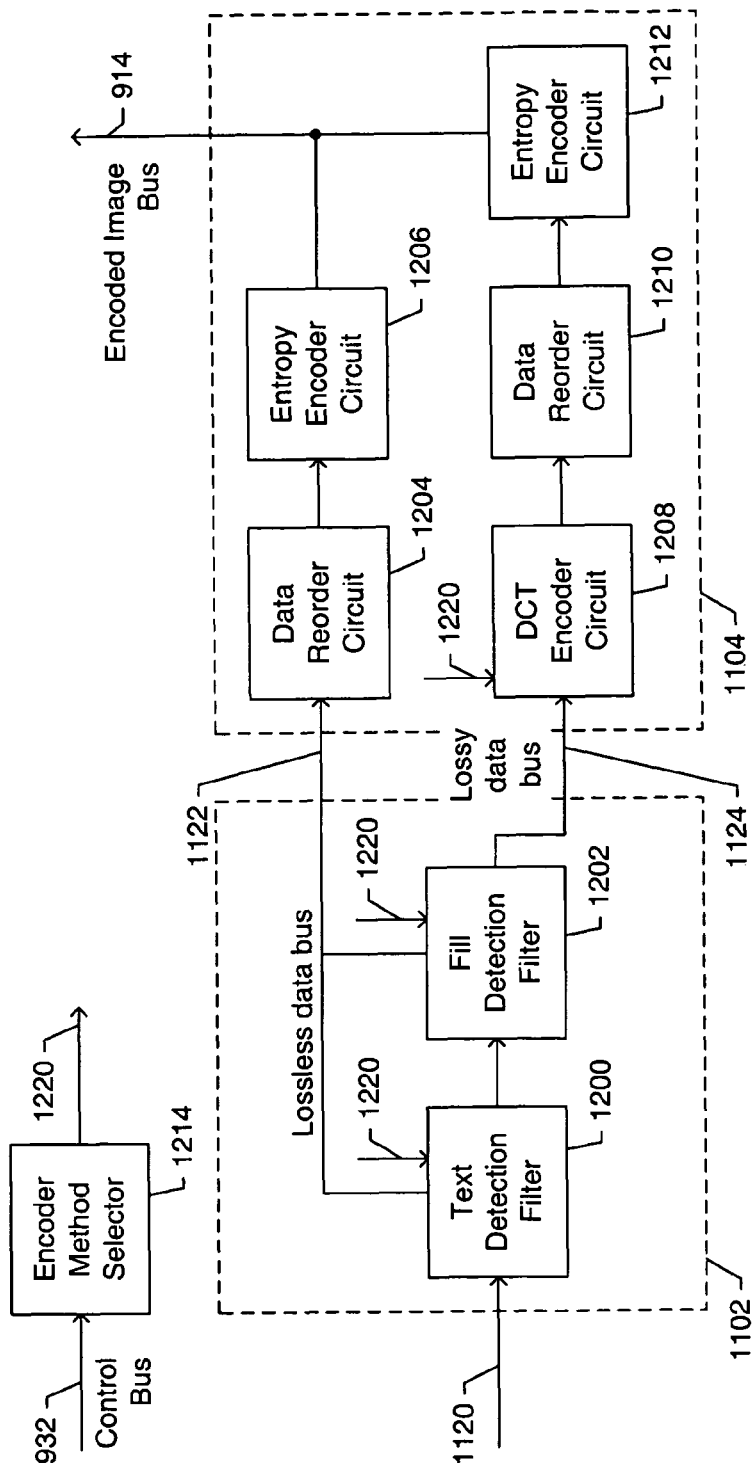
FIG. 12 illustrates in block diagram form a detailed view of image decomposition and multi-method encoder circuits.

FIG. 12 shows additional detail for an embodiment of image decomposition circuit 1102 and multi-method encoder circuit 1104. Image blocks are read by decomposition circuit 1102 on bus 1120 and passed through text detection filter 1200. In one embodiment, text detection filter 1200 includes 3-pixel, 4-pixel and 5-pixel pattern detection elements that detect high contrast areas of the image block and marks identified areas as text. In the embodiment, pixels that are not identified as text are passed through fill detection fitter 1202 which identifies contiguous rectangular regions of identical color as background fill. Areas identified as text or fill are then passed on lossless data bus 1122 to data reordering circuit 1204 where they are re-ordered in preparation for lossless entropy encoding. Areas neither identified as text nor fill are read across lossy data bus 1124 by DCT encoding circuit 1208 where the blocks are compressed using standard lossy DCT encoding methods, reordered by data reorder circuit 1210 and encoded by entropy encoding circuit 1212. Both lossy and lossless encoded data sets are forwarded across encoded image bus 914 to traffic manager 318.

Multi-method encoder circuit 1104 uses drawing command hints to improve encoding as previously described. In the embodiment shown, encoding method selector 1214 sets encoding parameters for the filters and encoders shown by writing to control registers of the circuits across control bus 1220.

Figure 13:
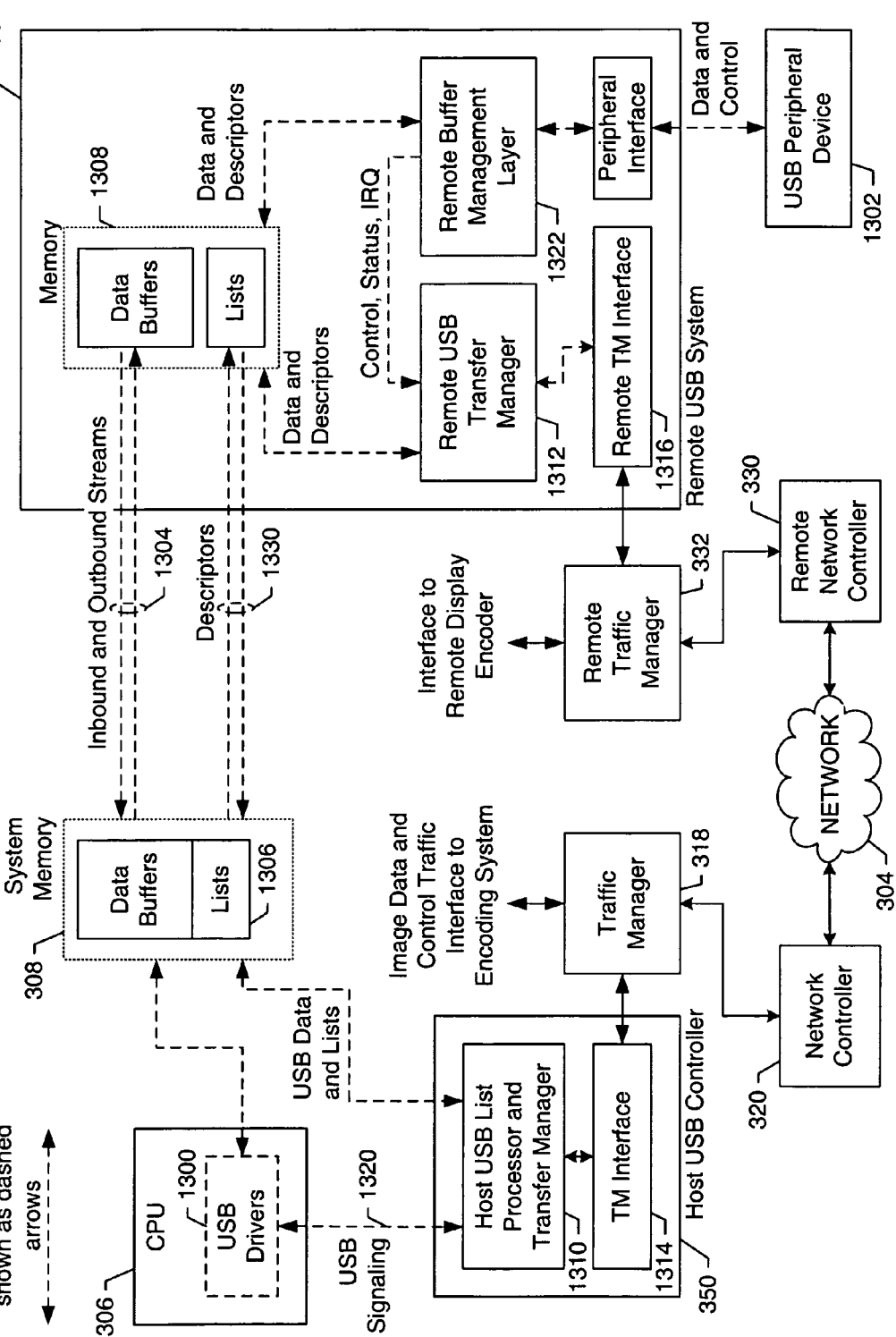
FIG. 13 illustrates in block diagram form a bridged USB system having a host USB controller and remote USB system.

FIG. 13 provides additional detail on the bridged USB system enabled by host USB controller 350 and remote USB system 354. In the embodiment shown in FIG. 13, CPU 306 incorporates USB drivers 1300 that coordinate the communication of USB data, including management of USB controller 350, initialization and control of descriptor lists and other standard driver functions. FIG. 13 illustrates the primary logical connections, data structures, control signaling and data flow between the CPU, system memory 308 and remote USB system 354. As shown, CPU 306 communicates with peripheral USB device 1302 using host USB controller 350 and remote USB system 354 to manage the communication between the endpoints at different layers. In the USB embodiment described, peripheral device 1302 is a USB device such as a USB mouse, USB memory card or any other USB peripheral.

At one layer, host USB controller 350 and remote USB system 354 enable the transfer of inbound and outbound USB data streams 1304 by maintaining out-of-phase synchronization between data buffers and lists 1306 in system memory 308 and data buffers and lists 1308 in remote USB system 354 using underlying transfer management and network interface infrastructure. In the case of a USB bridge, lists include buffer and endpoint descriptor lists which are maintained in phase at both sides of the network.

At a second layer, host USB list processor and transfer manager 1310 maintains a bidirectional link with the remote USB transfer manager 1312. Various update packets including list, operational register and data update packets are transferred between the two modules using the underlying traffic manager interfaces 1314 and 1316 with each module transferring specific update information back to the opposite end of the link. Different data buffers may be concatenated into single packets for network efficiency. Different USB data types such as endpoint or transfer descriptors, bulk data, control messages, interrupt messages or isochronous data types may be transferred using different network queues of varying priorities. In one embodiment, control, status and interrupts receive high priority while isochronous data receives medium priority and bulk data receives low priority.

At a lower layer, network controller 320 communicates with remote network controller 330. A reliable communication channel such as provided by the TCP/IP protocol is maintained for control and specified data packets while in some cases, such as isochronous media transfers, one or more best efforts channels such as provided by the UDP/IP protocol may be used.

From a functional perspective, host list processors and transfer manager 1310 maintain information that tracks changes to the descriptor lists, including transfer control list (e.g. delay fists), search lists, lists of free endpoint and buffer descriptor lists. Host USB list processor and transfer manager 1310 also maintains data queues of various traffic types for communications and tracks state information necessary to support the communication of inbound and outbound streams 1304. Host USB list processor and transfer manager 1310 communicates data and list information using published USB data and list structures (such as transfer descriptor and endpoint descriptors) in system memory 308.

Host USB list processor and transfer manager 1310 presents USB signaling interface 1320 to USB drivers 1300 that ensures addressing, timing and signaling (e.g. interrupt) of the peripheral device connection is in accordance with published USB specifications. For example in one embodiment, a standard OHCI operational register set interface is presented to the USB drivers corresponding with a remote OHCI USB controller.

Host USB list processor and transfer manager 1310 also supports packet processing methods. In the embodiment described, inbound packets are disassembled into individual messages, system memory lists are updated and data smoothing algorithms are applied to inbound isochronous data streams to prevent stalling of DMA functions. In one embodiment, a pacing method is also used to synchronize inbound control traffic with corresponding media packets which may arrive at different times and out of sequence.

From a functional perspective, remote USB transfer manager 1312 maintains a remote list and host-bound data queues using buffers in memory 1308. In the embodiment illustrated, remote USB transfer manager 1312 also performs state management functions in accordance with the USB specification. For example, the USB specification declares timing restrictions in the interval between certain USB operational state transitions. Remote USB transfer manager 1312 implements timers to ensure that these requirements are met. If an operational state update is received that would cause a violation, the update is ignored by remote USB transfer manager 1312. A subsequent operational state update, after the time requirement has been satisfied, is accepted to move remote buffer management layer 1322 to the desired state. Remote USB transfer manager 1312 also manages update packets to and from host USB list processor and transfer manager 1310 and performs packet processing functions using similar methods to those described for host USB list processor and transfer manager 1310.

From a functional perspective, remote buffer management layer 1322 accesses lists in memory 1308 and performs list processing of data buffers similar to those described for the buffer management layer. In the embodiment described, it also communicates with remote USB transfer manager 1312 by generating response messages and host-bound interrupt messages based on USB peripheral status and responds to control messages from CPU 306. USB system timing is derived from remote USB system 354. Peripheral device 1302 consumes (or generates) data at USB bus data rates determined by the peripheral interconnect and remote buffer management layer 1322 consumes (or generates) lists based on peripheral data rates and maintains synchronization with host USB list processor and transfer manager 1310 by requesting or sending list updates as needed.

In the embodiment shown, the peripheral interface presents a USB interface as defined by OHCI/EHCI and USB specifications to peripheral device 1302. This includes power management response mechanism (for example a bus monitor to support a wake up state request) and transport means for standard USB clock, command, response and data types.

Figure 14:
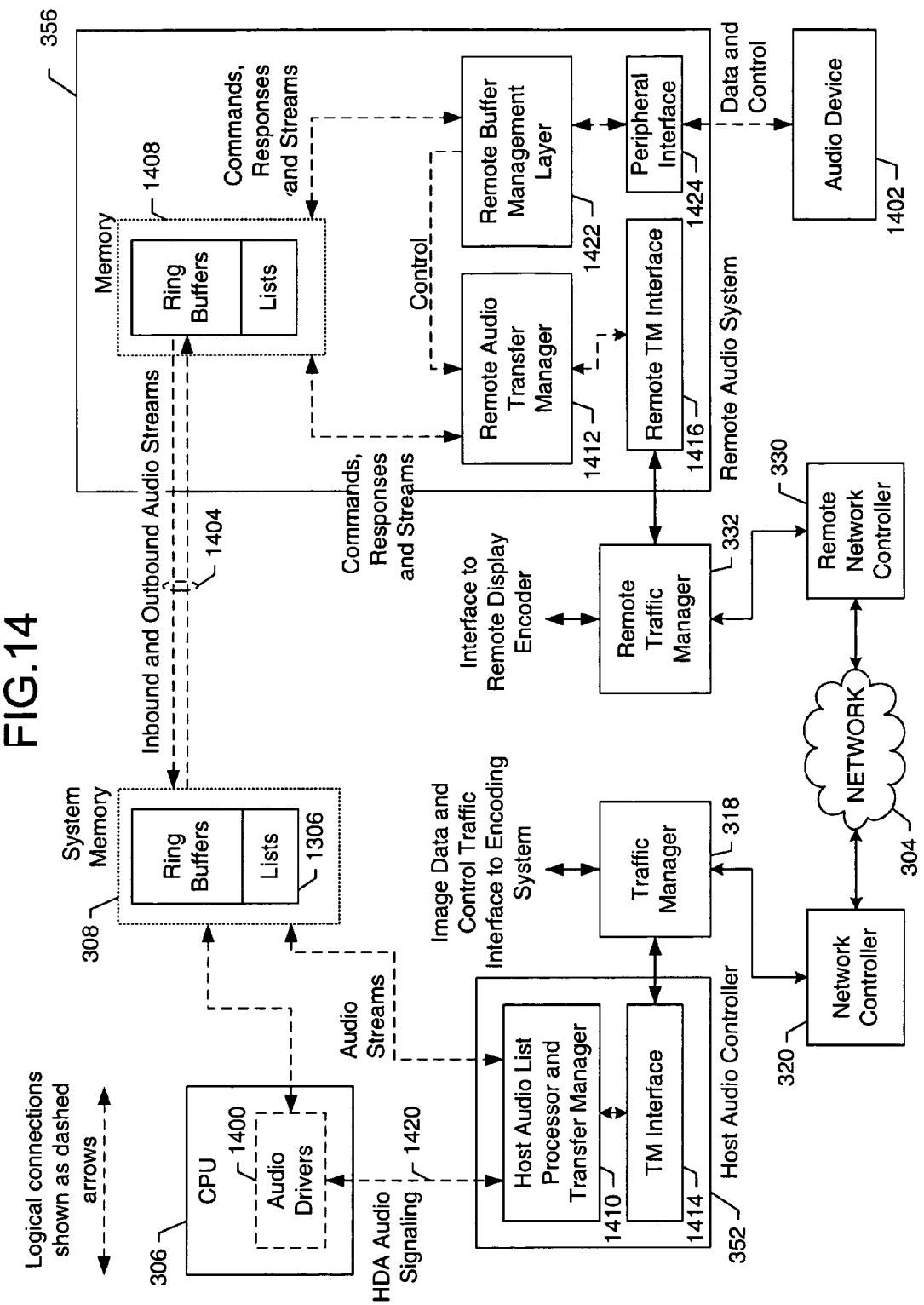
FIG. 14 illustrates in block diagram form a bridged audio system having a host audio controller and remote audio system.

FIG. 14 provides additional detail on the bridged audio system enabled by host audio controller 352 and remote audio system 356. As illustrated, CPU 306 incorporates audio drivers 1400 that co-ordinate the communication of audio data, including management of host audio controller 352, initialization and control of command, response and audio data buffers in addition to other standard driver functions.

FIG. 14 illustrates the primary logical connections, data structures, control signaling and data flow between the CPU, system memory 308 and remote audio system 356. As shown, CPU 306 communicates with peripheral audio device 1402 using host audio controller 352 and remote audio system 356 to manage the communication between the endpoints at different layers. In the HDA audio embodiment illustrated, peripheral device 1402 is an HDA codec device.

At the audio stream layer, host audio controller 352 and companion remote audio system 356 enable the transfer of inbound and outbound audio streams 1404 by maintaining a set of ring buffers in system memory 308 and memory 1408, one buffer corresponding to each inbound or outbound audio stream. Each buffer in memory 1408 corresponds to an HDA virtual stream buffer for the corresponding stream in system memory 308. Audio streams are unidirectional data streams without the synchronization and data type complexity of the USB embodiment described above. Therefore, the HDA Command Outbound Ring Buffer (CORB) command structure, the Response Inbound Ring Buffer (RIRB) response structure and inbound or outbound media streams do not have the same timing sensitivity as USB, and tight synchronization of lists is not required at remote audio system 356. Rather, the CORB list has corresponding simple output command FIFO and the RIRB list has corresponding simple inbound response FIFO.

At a second layer, host audio list processor and transfer manager 1410 maintains a bidirectional link with remote audio transfer manager 1412. Outbound packets comprising outbound data streams, commands and internal control messages are transferred from host audio list processor and transfer manager 1410 to remote audio transfer manager 1412 and host-bound data streams, codec responses and internal control messages are transferred from remote audio transfer manager 1412 to host audio list processor and transfer manager 1410 using the underlying traffic manger manager interfaces 1414 and 1416 with each module transferring specific update information back to the opposite end of the link.

At a lower layer, network controller 320 communicates with remote network controller 330. A reliable communication channel such as provided by the TCP/IP protocol is maintained for control and specified data packets while in some cases, such as isochronous media transfers, one or more best efforts channels such as provided by the UDP/IP protocol may be used.

From a functional perspective, host audio list processor and transfer manager 1410 transfers published HDA audio list structures from system memory 308 to remote audio transfer manager 1412 for relay to peripheral device 1402.

Host audio list processor and transfer manager 1410 presents audio signaling interface to audio drivers 1400 that ensures addressing, timing and signaling (e.g. interrupt) of the peripheral device connection is in accordance with published HDA audio specifications. A subset of the published register information held by host audio list processor and transfer manager 1410 and also used by peripheral device 1402 is maintained at remote buffer management layer 1422 and synchronized as required.

Host audio list processor and transfer manager 1410 may also include data processing algorithms suitable for the data type being transferred. One embodiment includes various packet processing functions optimized to meet the requirements of real time audio processing. As one example, a packet loss concealment algorithm such as G.711A or other may be applied to inbound packets. As another example, silence suppression or audio compression methods may be applied to outbound audio data prior to transmission in order to reduce the audio bandwidth.

Host audio list processor and transfer manager 1410 also deploys synchronization methods to ensure optimum FIFO buffer levels. Given that the audio data rate is determined at remote audio system 356 by the clock rate of a peripheral interconnect, host audio list processor and transfer manager 1410 is synchronized to the remote timing system. One method of achieving synchronization of outbound audio is to regulate the playout of host frames to remote audio system 356 based on buffer level control commands issued by remote audio transfer manager 1412.

Remote audio transfer manager 1412 manages the communications of command, response and stream data between memory 1408 and host audio list processor and transfer manager 1410. It maintains pointers to jitter buffers and command buffer in memory 1408 and includes a packet generator that generates host bound control and data packets with timing information such as frame identifiers. It also performs various packet processing functions including jitter buffering of outbound streams, optional packet loss concealment methods on outbound packet streams and compression or suppression of inbound packet streams. Remote audio transfer manager 1412 also performs register management function such as generating control packets that instruct host audio list processor and transfer manager 1410 to update published registers in cases where these are modified and updates register information as instructed by host audio list processor and transfer manager 1410.

Remote buffer management layer 1422 performs buffer management functions. It generates frame data for outbound frames, reads data from jitter buffers and generates data formats required by the peripheral interface. It communicates with remote audio transfer manager 1412. Communications include transfer of outbound commands to peripheral interface 1424, in addition to processing and framing of inbound responses and interrupts. It groups inbound samples on a per-stream basis and forwards the groups to remote audio transfer manager 1412.

The tables below illustrate examples of drawing commands from various APIs that may be used by the display encoder to optimize image compression and transfer.

TABLE 1

Drawing Command Structures for Change Detect Optimization
CHANGE DETECT CIRCUIT

| Command Example | Application of Command in the Circuit | API Example |
|---|---|---|
| Draw . . . | Track absence of writing commands in area | GDI |
| Fill . . . /Floodfill | | |
| Rect | Track absence of writing commands in area | OpenGL |
| Viewport | | |
| Raster Commands | | |

TABLE 2

Drawing Command Structures for Decomposition Optimization
DECOMPOSITION CIRCUIT

| Command Example | Application of Command in the Circuit | API Example |
|---|---|---|
| FillRectangle | Identifies area for possible background layer decomposition | GDI |
| FillEllipse | | |
| Line Draw Commands | | OpenGL |
| DrawString | Indicates area for text layer decomposition | OpenGL |
| TextRenderingHint | Indicates desired quality of text display | GDI+ |
| BitBit/Bitmap | Indicates area for picture or object layer decomposition | GDI/OpenGL |
| IVideoWindow | Indicates area for picture layer decomposition | DirectShow |

TABLE 3

Drawing Command Structures for Encoder Selector Optimization
ENCODER SELECTOR CIRCUIT

| Command Example | Application of Command in the Circuit | API Example |
|---|---|---|
| Quality and performance Hints | Influences selection of encoder method and parameters | OpenGL |
| IDMOQualityControl IDMOVideoOutput-Optimizations | Influences selection of encoder method and parameters | DirectX DirectX |
| MPEG1VIDEOINFO | This structure describes an MPEG-1 video stream | DirectShow |
| MPEG2VIDEOINFO | This structure describes an MPEG-2 video stream | |
| VIDEOINFO | This structure describes the bitmap and color information for a video image | |

TABLE 4

Drawing Command Structures for Compression Method Selection
ENCODER SELECTOR CIRCUIT

| Command Example | Application of Command in the Circuit | API Example |
|---|---|---|
| Quality and performance Hints | Influences selection of encoder method and parameters | OpenGL |
| IDMOQualityControl IDMOVideoOutput-Optimizations | Influences selection of encoder method and parameters | DirectX DirectX |
| MPEG1VIDEOINFO | This structure describes an MPEG-1 video stream | DirectShow |
| MPEG2VIDEOINFO | This structure describes an MPEG-2 video stream | |
| VIDEOINFO | This structure describes the bitmap and color information for a video image | |

TABLE 5

Drawing Command Structures for Predictive Encoding
PREDICTIVE ENCODER CIRCUIT

| Command Example | Application of Command in the Circuit | API Example |
|---|---|---|
| Viewport | Motion Search | OpenGL |
| Rotate;Translate;Scale | Motion Search | OpenGL |
| CopyPixel | Motion Search; Display Update | OpenGL |
| Quality and performance Hints | Compression Parameters | OpenGL |
| IDMOVideoOutput-Optimizations | Compression Parameters | DirectX |
| IAMVideoCompression | Sets and retrieves video compression properties | DirectShow |
| IAMVideoAccelerator | Enables a video decoder filter to access video accelerator functionality | |
| IAMVideoDecimation-Properties IDecimateVideoImage | Enables an application to control where video decimation occurs Interface specifies decimation on a decoder filter. The term decimation refers to scaling the video output down to a size smaller than the native size of the video | |

TABLE 6

Drawing Command Structures for Progressive Encoding
PROGRESSIVE ENCODER CIRCUIT

| Command Example | Application of Command in the Circuit | API Example |
|---|---|---|
| Lighting Enable | Build lighting features | OpenGL |
| Quality and performance Hints | Minimize progressive build in areas flagged as high quality | OpenGL |

TABLE 7

Drawing Command Structures for Lossless Encoding
LOSSLESS ENCODER CIRCUIT

| Command Example | Application of Command in the Circuit | API Example |
|---|---|---|
| Performance Hints | Influence compression ratio | OpenGL |

TABLE 8

Drawing Command Structures for Traffic Shaping
TRAFFIC SHAPER

| Command Example | Application of Command in the Circuit | API Example |
|---|---|---|
| Performance Hints | Influence traffic priority for encoded stream | OpenGL |
| IDMOVideoOutput-Optimizations IDMOQualityControl IVideoWindow | Influence traffic priority for encoded stream | DirectX |

TABLE 9

Drawing Command Structures for Power Management
POWER MANAGEMENT

| Command Example | Application of Command in the Circuit | API Example |
|---|---|---|
| Draw . . . Fill . . . /Floodfill | Track absence of writing commands in area | GDI |
| Rect Viewport Raster Commands | Track absence of writing commands in area | OpenGL |

While methods and apparatus for encoding a shared drawing memory have been described and illustrated in detail, it is to be understood that numerous changes and modifications can be made to embodiments of the present invention without departing from the spirit thereof.

What is claimed is:

1. A method of remotely accessing and operating a host computing system, comprising:
   generating a DVI-compatible video output signal from the host computing system responsive to input from a remote access system, said DVI-compatible video output signal comprising a plurality of images where each image in the plurality of images has a corresponding image type determined based on at least one of spatial or temporal features of the image;
   encoding the DVI-compatible video output signal as a stream of compressed data packets, wherein an encoding method of said encoding is determined based on the corresponding image type and on network bandwidth information, the network bandwidth information based on at least one of monitored network bandwidth availability or predicted network bandwidth availability;

transmitting the stream of compressed data packets to the remote access system, across a communications network; and decoding the stream of compressed data packets at the remote access system, thereby reconstructing the DVI-compatible video output signal for display at the remote access device without human-perceptible interaction latency with respect to the input.

2. The method of claim 1, where said encoding method comprises differential encoding and progressive build encoding.

3. The method of claim 1, where said corresponding image type is determined at least partly based upon one or more drawing commands that were performed to generate the corresponding images.

4. The method of claim 1, where said network bandwidth information comprises at least one of (1) available bandwidth or (2) predicted bandwidth requirements.

5. A display drawing and encoding system comprising:
   at least one processor for drawing at least one image representation at a schedule;
   an encoding module for encoding the at least one image representation at a first throughput rate;
   a transmission module for communicating the encoded at least one image representation at a second throughput rate; and
   a decoder for receiving and decoding the communicated at least one image representation at a third throughput rate;
   wherein the schedule is managed according to a first set of parameters associated with at least one of the first throughput rate, the second throughput rate or the third throughput rate.

6. The display drawing and encoding system of claim 5, wherein the first set of parameters comprises maximum throughput rates.

7. The display drawing and encoding system of claim 5, wherein managing the schedule comprises synchronizing the drawing of the at least one image representation with the encoding of the at least one image representation.

8. The display drawing and encoding system of claim 5, further comprising:
   a bridged USB controller for encoding USB controller data at a fourth throughput rate,
   wherein the schedule is further managed according to a second set of parameters associated with the fourth throughput rate.

9. The display drawing and encoding system of claim 8, further comprising:
   a bridged audio controller for encoding audio controller data at a fifth throughput rate,
   wherein the schedule is further managed according to a third set of parameters associated with the fifth throughput rate.

10. The display drawing and encoding system of claim 5 further comprising a traffic manager for receiving the first set of parameters.

11. A method of managing a processing resource used to draw image representations, the method executed under the control of a processor configured with computer executable instructions, the method comprising:
    determining, by a host system having one or more processors, a first set of parameters associated with scheduling of an encoder, the encoder used to encode the image representations;
    determining, by the host system having the one or more processors, a second set of parameters associated with throughput of a transmitter, the transmitter used to communicate the encoded image representations;
    determining, by the host system having the one or more processors, a third set of parameters associated with throughput of a decoder, the decoder used to decode the communicated image representations; and
    controlling, by the host system having the one or more processors, a drawing command rate to the processing resource based on at least one of the first set of parameters, the second set of parameters or the third set of parameters.

12. The method of claim 11 wherein managing the processing resource comprises allocating processing cycles to the processing resource.

13. The method of claim 11, wherein the first set of parameters comprises a maximum throughput rate associated with the encoder.

14. The method of claim 11, wherein the second set of parameters comprises a maximum throughput rate associated with the transmitter.

15. The method of claim 11, wherein the third set of parameters comprises a maximum throughput rate associated with the decoder.

* * * * *